United States Patent [19]
Tanabe et al.

[11] Patent Number: 5,164,937
[45] Date of Patent: Nov. 17, 1992

[54] PACKET CONCENTRATOR AND PACKET SWITCHING SYSTEM

[75] Inventors: Shirou Tanabe, Hachioji; Akihiko Takase, Suginami; Masao Kunimoto; Yoshito Sakurai, both of Yokohama, all of Japan

[73] Assignee: Hitachi, Ltd., Tokyo, Japan

[21] Appl. No.: 551,930

[22] Filed: Jul. 12, 1990

[30] Foreign Application Priority Data

Jul. 14, 1989 [JP] Japan .................... 1-180319

[51] Int. Cl.$^5$ ........................ H04G 11/04; H04J 3/24
[52] U.S. Cl. ........................ 370/56; 370/60; 370/94.1
[58] Field of Search ............... 370/56, 60, 94.1, 60.1, 370/94.2

[56] References Cited

U.S. PATENT DOCUMENTS 4,964,119 10/1990 Endo et al. ..................... 370/60

OTHER PUBLICATIONS

CCITT Red Book X.25, vol. VIII, Data Communication Networks Interfaces, Geneva 1985, ISBN 92-6-1-02321-5, pp. 109–111.
CCITT Red Book X.75, vol. VIII, Data Communication Networks Transmission, Signalling and Switching, Network Aspects, Maintenance and Administrative Arrangements, Geneva 1985, pp. 152–154.
Packet Switching Technology and Its Application, pp. 88–89 and 100–105.
IEICE Technical Report SSE88-56, "A Memory Switch Architecture for ATM Switching Network", by Noboru Endo et al., pp. 37–42.

Primary Examiner—Douglas W. Olms
Assistant Examiner—Wellington Chin
Attorney, Agent, or Firm—Fay, Sharpe, Beall, Fagan, Minnich & McKee

[57] ABSTRACT

A method and system are provided for concentrating calls for a packet switching system in a hierarchical communication network. A plurality of terminals communicate with an associated plurality of packet concentrators that, in turn, communicate with switching equipment. The system and method comprise initiating a call at a call terminal to be communicated to the packet concentrator and identifying the call terminal by associating a line number communicating the terminal with the concentrator with a first logical channel number for communication from the packet concentrator to the switching equipment. The logic channel number is recorded in association with the first number line at the packet concentrator whereby call communication back to the call terminal can be made on the proper line number by relating the line number with the logic channel line of the call and thereby avoiding the need to switch logic channels between the concentrator and the switching equipment to avoid costly call processing at the concentrator. Further benefits provided by executing of the general call processing at the switching equipment including tariff control.

23 Claims, 17 Drawing Sheets

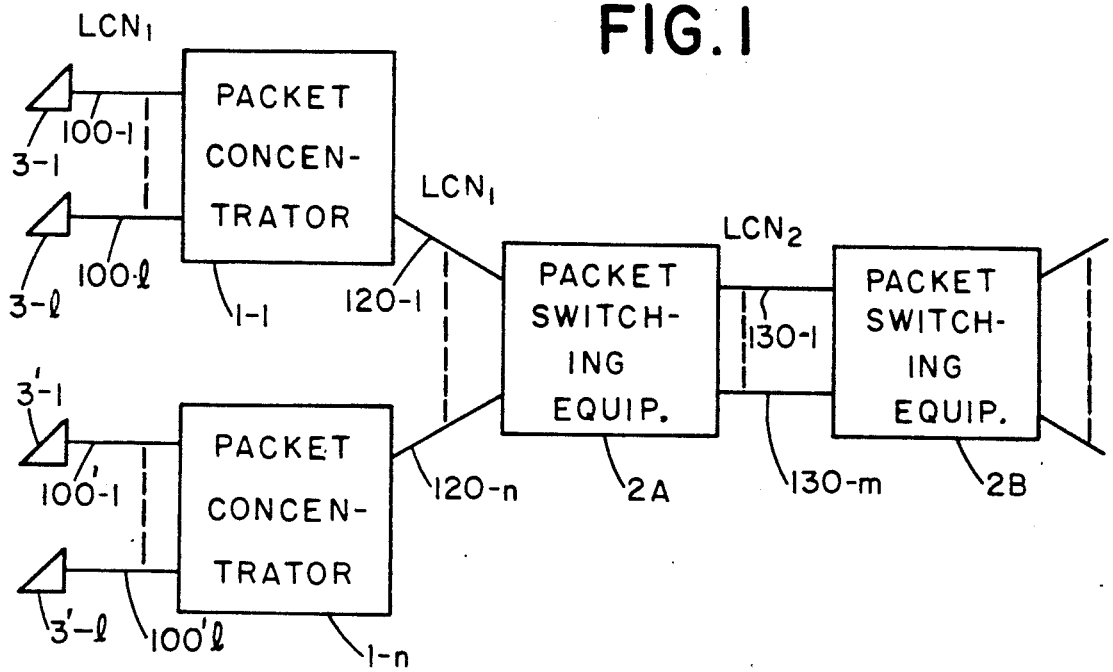
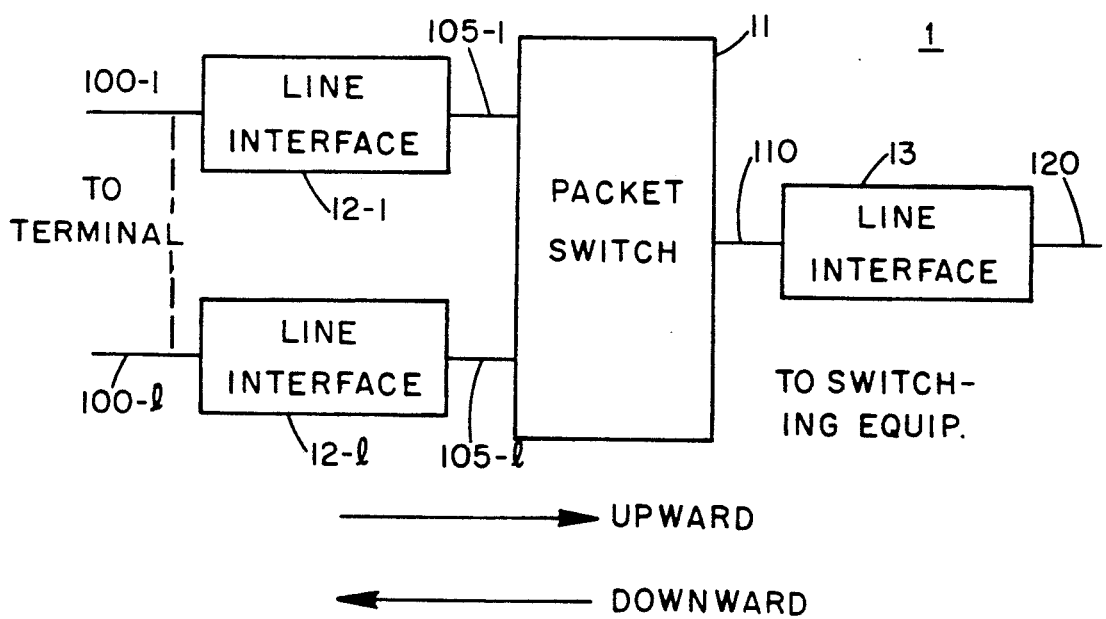

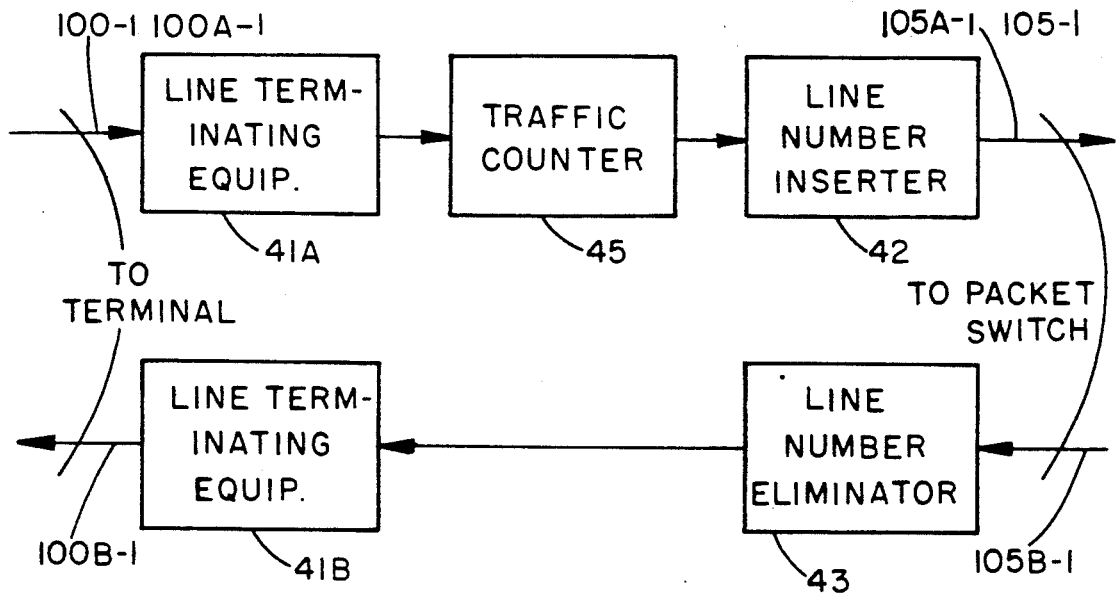
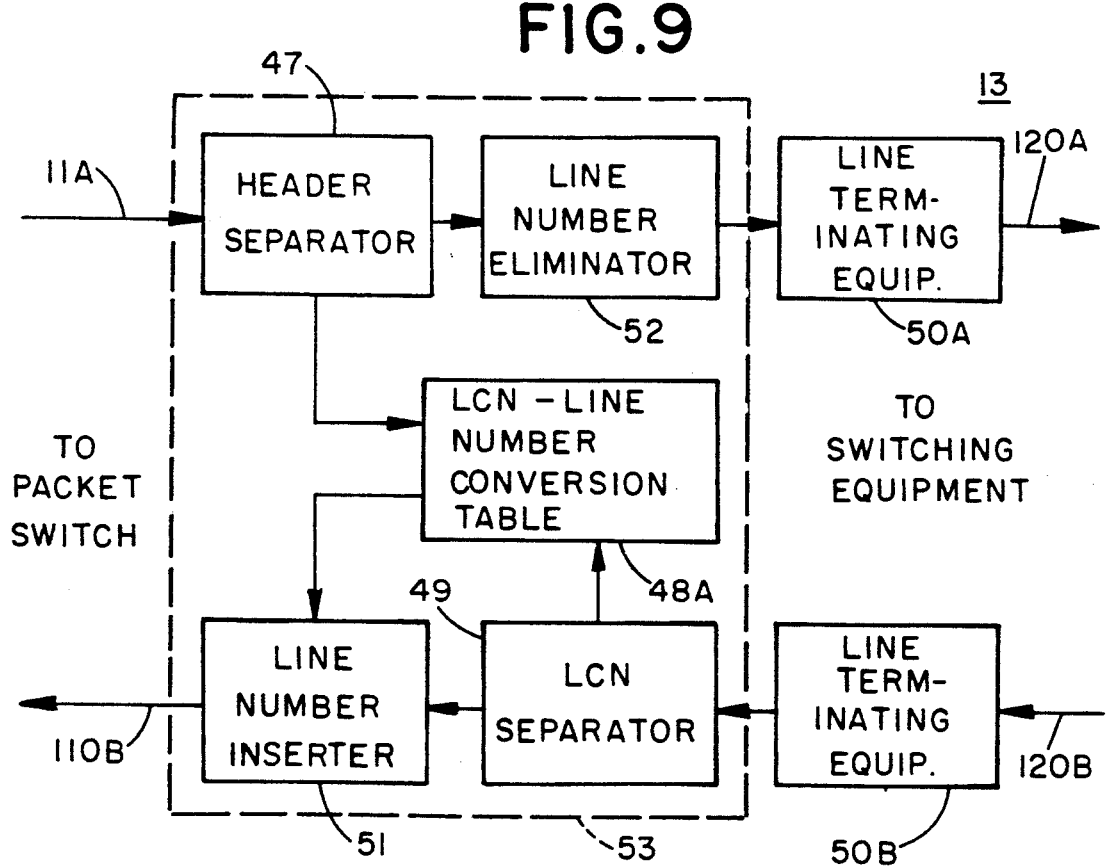

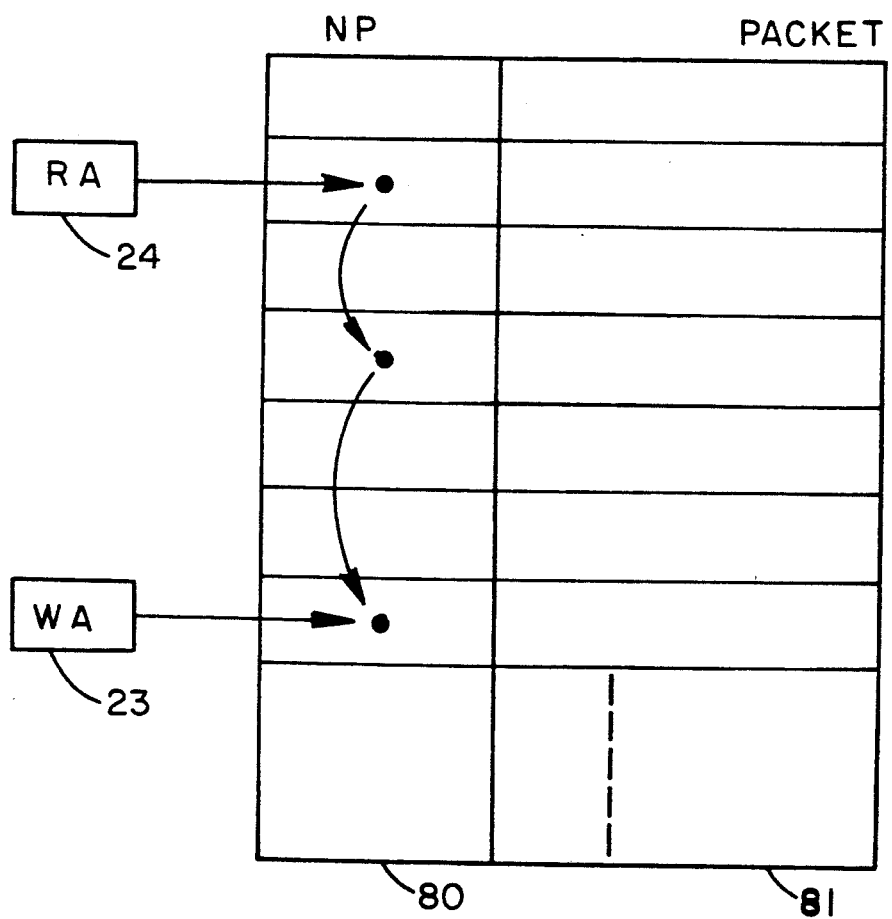

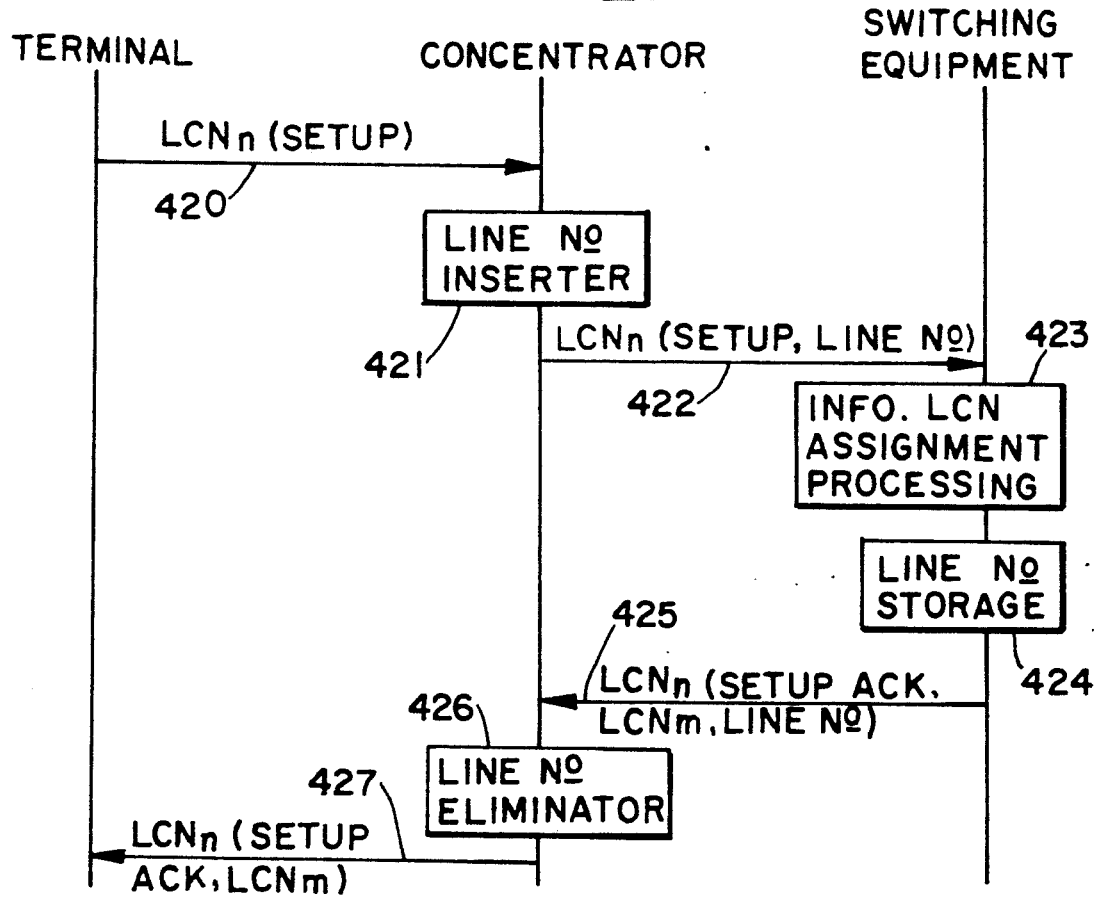
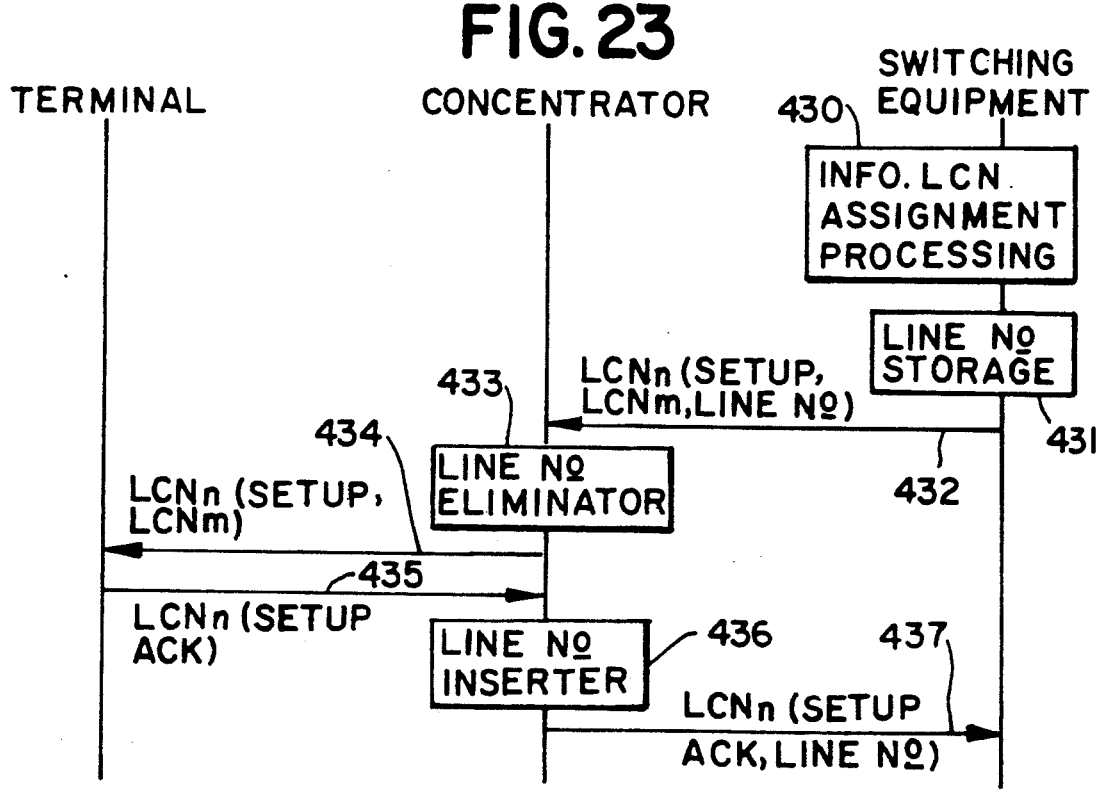

PACKET CONCENTRATOR AND PACKET SWITCHING SYSTEM

BACKGROUND OF THE INVENTION

1. Field of the Invention

The present invention relates to a data communication system comprising a packet switching system and a packet concentrator in a packet network.

2. Description of the Prior Art

Typical examples of a multiplexing system for packet switching equipment are described in the CCITT RED BOOK X.25 (a user-network interface) and X.75 (a network-network interface). These examples are also briefly described on pp.100-102 of *Packet Switching Technology and Its Application* (the Institute of Electronic, Information, and Communication Engineers). For a conventional packet concentrating system, there are known two different concentrating systems as described on pp.88 and 89, and pp.102-105 of the above-mentioned *Packet Switching Technology and Its Application*.

The first concentrating system is shown, for example, in FIG. 31 wherein a packet multiplexer (PMX) 604 in which data 601-1 to 601-3 is sent from lines connected to a plurality of non-packet mode terminals (NPT) 600-1 to 600-3. The data is packed by the PMX and then sent on the same line 605 with terminal identifications in the labels of the packets 606-1 to 608-n.

The second concentrating system is shown, for example, in FIG. 32 wherein a packet concentrator 620 (comprised of elements 620-1 to 620-l) and a packet distributor 630 operate so that the output from each concentrator element is provided to the distributor 630 through an n number of output lines (612-1 to 612-n) which is less than an m number of input packet lines (611-1 to 611-m). Here, a logical channel for the terminal data must be set link by link and different logical channels are set between a terminal 610 and the packet concentrator 620 and between the packet concentrator 620 and packet distributor 630.

Problems to be Solved by the Invention

In the first conventional concentrating system mentioned above, input lines connected to the concentrator 604 do not provide any packet multiplexing because they come from only non-packet mode terminals. Therefore, only a single call can be handled per terminal. The lack of efficiency for this system makes it highly undesirable for large or dense data communication systems.

In the second conventional concentrator system mentioned above, since an individual call is set link-by-link, it becomes necessary for the concentrator to also switch logical channels. Consequently, the concentrator is required to administrate logical channels, i.e., to have a capability to terminate a control signal and execute call processing. It becomes impossible for any switching equipment which is placed higher than the concentrator to identify the sender of information being transmitted because the logical channel number is changed by the time that switching equipment receives the data signal. The concentrator, besides completing its primary concentrating tasks, is therefore required to also execute extensive controlling processes with regard to the sender such as a tariff control and others. The individual packet switching equipment needs the capability of processing functions to terminate a call control signal as a concentrating node for concentrating multiplexed lines by logical channel numbers. This extensive control processing becomes a substantial problem to be solved with the continued expansion of packet line converging and multiplexing of communication media. The conventional system in which a packet switching equipment is arranged with such a concentrating node is costly, and raises a serious problem in that respect.

A need exists for a system that permits the switching equipment to perform the substantive portion of call processing while providing a simpler and less costly concentration of terminal cells.

BRIEF SUMMARY OF THE INVENTION

In accordance with the present invention a packet switching system is provided comprising a concentrator for concentrating multiplexed packet lines without switching logical channels for reduced call processing at the concentrator.

The concentrator is provided in a packet network in which a switching equipment, a concentrator, and terminals are hierarchically arranged. The concentrator concentrates multiplexed packet lines without switching logical channels. The same logical channel number (LCN) is used between a terminal and a concentrator as well as between a concentrator and the switching equipment in a connection on a call. In order to transmit a down packet from the switching equipment to a concentrator in a line in which an up packet from the terminal having the same LCN as the LCN of said packet is inputted, the concentrator has a means for storing an input line number corresponding to the LCN, and a means for inserting the above-mentioned line number into the concentrator and the switching equipment as a packet. The switching equipment has a means for charging by each line the number of communication packets counted according to the LCN by use of the line number inserted into the above-mentioned packet.

According to another feature of the present invention, the line number stored in accordance with the LCN in the above-mentioned concentrator is read by each LCN when the down packet from the switching equipment terminates. Thus, the concentrator sends the packet to a terminal line to which said LCN is connected. Also, in a packet communication system including a line number between a switching equipment and a concentrator, the concentrator inserts a line number of the packet received into an up packet, and the switching equipment inserts a line number stored when the up packet is received. Then, the packet is sent by the concentrator to a terminal line to which the terminal of that LCN is connected, while a tariff control can be executed by the switching equipment by the line number.

It is a benefit and object of the present invention that a packet switching system and method can be provided which includes a concentrator which avoids extensive call processing therein for a far less costly system that can readily adapt to the expansion of packet line converging and expansion of communication media.

Another benefit and object is the provision of a packet network which allows a switching equipment placed higher than a concentrator to execute general call processing such as tariff control and other processing steps.

BRIEF DESCRIPTION OF THE DRAWINGS

FIG. 1 is a schematic diagram illustrating the architecture of a network to which the present invention is applied;

FIG. 2 is a diagram showing an example of the structure of a packet concentrator;

FIGS. 5 to 9 are diagrams showing specific structures of circuits comprising a packet concentrator, and FIG. 5 is a diagram showing the circuitry of a packet switch, FIG. 6 is a diagram showing an up switch of the packet switch circuitry, FIG. 7 is a diagram showing a down switch thereof, and FIGS. 8 and 9 are diagrams showing the details of a line interface;

FIG. 10 is a view illustrating a shared buffer memory in a packet switch;

FIGS. 20 to 25 are diagrams representing signal sequences for inserting a line number into a packet;

DETAILED DESCRIPTION OF THE PREFERRED EMBODIMENTS

Figure 3:
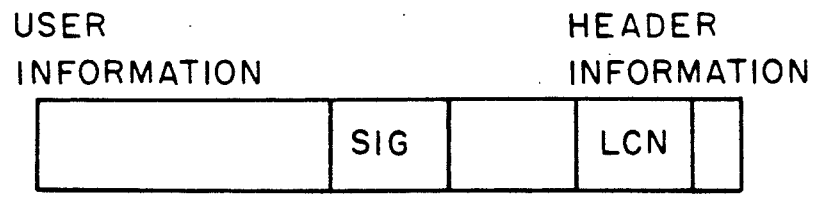
FIGS. 3 and 4 are views each representing the format of a packet being transferred in this network.

Referring now to the drawings wherein the showings are for purposes of illustrating preferred embodiments of the invention only and not for purposes of limitation thereto, the FIGURES show four principal embodiments of features of the subject packet switching system. Embodiment 1 is a system in which a corresponding line for a down signal from a higher packet switching equipment is identified without terminating signals in a packet concentrator, and which has a storing function for an LCN and a line number in a packet concentrator. Embodiment 2 is a system for inserting a line number into the packet header communicated between a packet concentrator and a packet switching equipment. Embodiment 3 is a packet control system including a line inputted from a terminal to a packet switching equipment through a packet concentrator and a line inputted directly without a packet concentrator. Embodiment 4 is a tariff control system of a packet switching equipment made in accordance with the present invention.

Embodiment 1

1.1 Description of the architecture
(1) The network formation

An embodiment of a packet network comprising the present invention is shown in FIG. 1. The network has a hierarchical structure comprising a plurality of packet concentrators (1-1 to 1-n) for concentrating each of a plurality of packet lines 100 (100-1 to 100-l) from each of a plurality of terminals 3 (3-1 to 3-l) at a packet line 120 (120-1 to 120-n). The packet line 120 is connected to the packet concentrator 1 and packet switching equipment 2 (2A and 2B) which distribute transit packet line 130 (130-1 to 130-m) from switching equipment 2A to the other packet switching equipment 2B. It is a feature of the invention that a logical channel (LCN1) between the packet concentrator 1 and the packet switching equipment 2A is the same as the logical channel between the terminal 3 and the packet concentrator 1, but is different from a logical channel (LCN2) between the packet switching equipment 2A and the packet switching equipment 2B. In other words, an LCN is switched in the packet switching equipment 2, but the LCN is not switched in the packet concentrator 1.

As shown in FIG. 2, the packet concentrator 1 comprises a packet switch 11 for concentrating packet lines 100-1 to 100-l connected to packet terminals 3 and line interfaces 12-1 to 12-l for terminating each line, and a line interface 13 connected to the packet line 120 which in turn is connected to the packet switching equipment 2. The packet concentrator 1 according to this embodiment concentrates a plurality of lines (100-1 to 100-l) connected to the terminals 3 on a packet line 120 connected to the higher switching equipment 2A.

Figure 5:
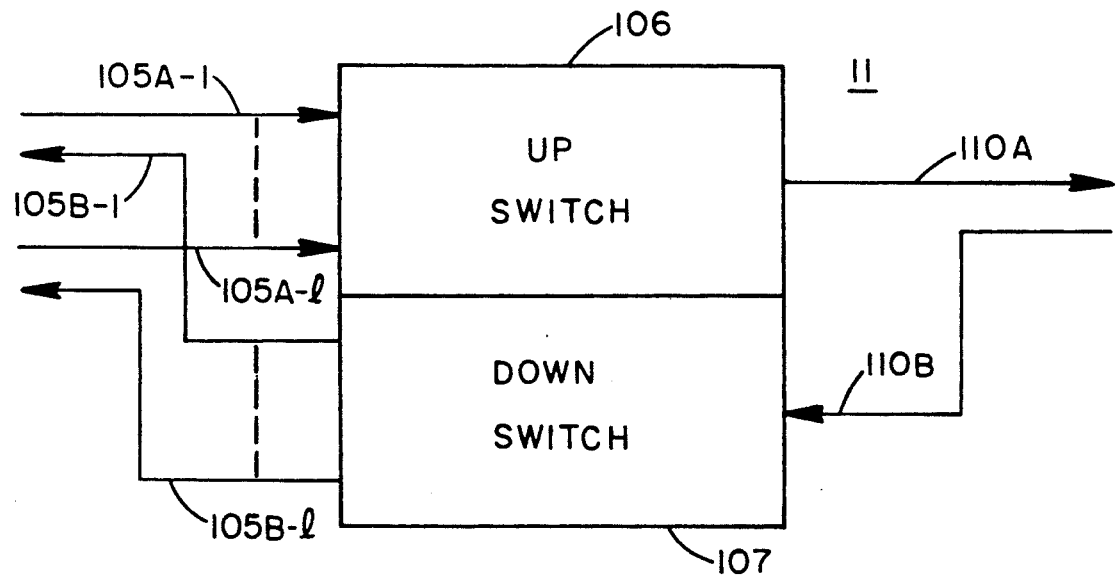
Figure 6:
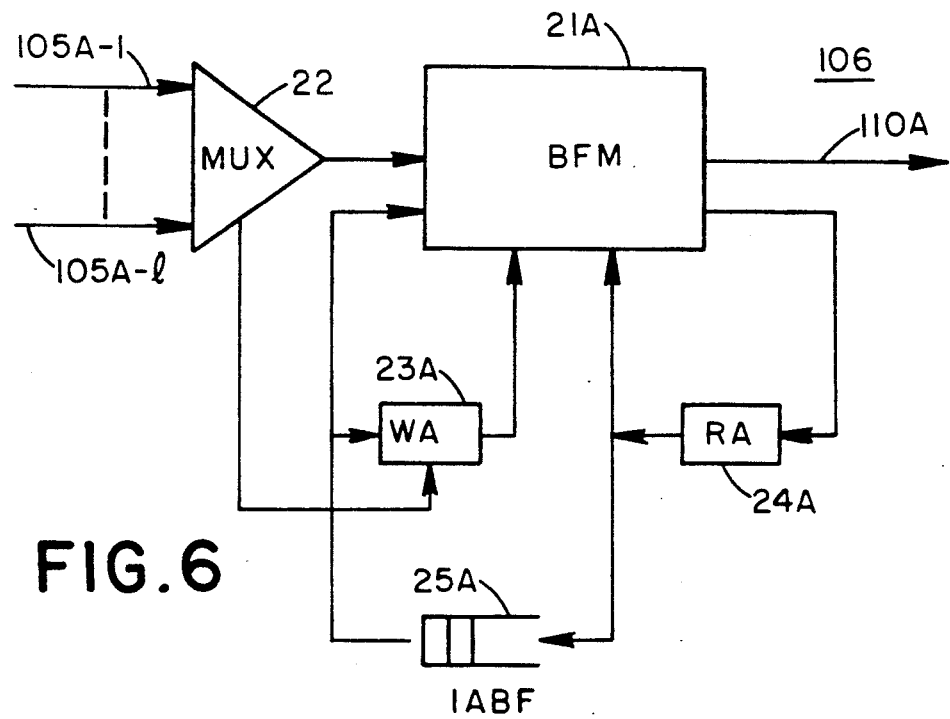
Figure 18:
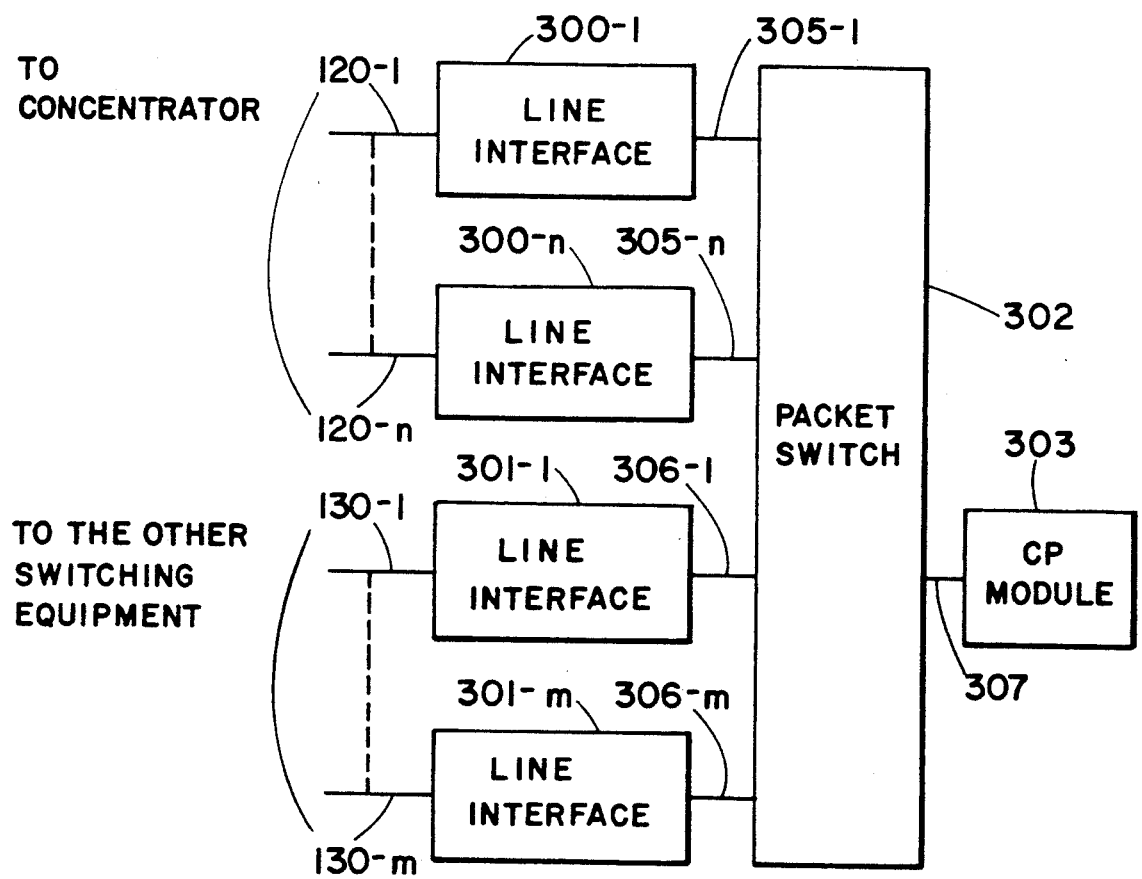
FIG. 18 is a schematic diagram showing an example of a packet switching equipment.

FIG. 5 is a diagram showing the circuit structure of the packet switch 11, comprising an up switch 106 for processing a packet from the terminal 3 to the switching equipment 2A and a down switch 107 for processing a packet from the switching equipment 2A to the terminal 3. The details of the up switch 106 are shown in FIG. 6, and the details of the down switch 107, in FIG. 7, respectively. The circuit formation of line interfaces 12 and 13 in the concentrator 1 are shown in FIGS. 8 and 9. As shown in FIG. 18, the packet switching equipment 2 comprises a packet switch 302 for distributing packets, line interfaces 300 (300-1 to 300-m) for terminating lines 120-1 to 120-n connected to the packet concentrator 1, line interfaces 301 (301-1 to 301-m) that are connected to transit packet lines 130-1 to 130-m, and a CP (Call Processing) module 303 for call processing, maintenance and administration.

As noted above, the packet concentrator 1 has a feature that it communicates a packet from the switching equipment to the terminals with the same logical channel number LCN. A function is provided for sending a down packet inputted from the packet switching equipment 2A to the proper inputted line (one of the lines 100) of a terminal 3 by storing a line number corresponding to the LCN.

(2) The structure of the packet switch

Each packet switch 11 is based on an ATM (Asynchronous Transfer Mode) switch, a memory switch introduced, for example in a paper *IEICE Technical Report SSE*88-56 (A study on the ATM switching architecture). As shown in FIG. 5, the entire structure of the packet switch 11 comprises the up switch 106 and the down switch 107. The up switch 106 sends packets received from a plurality of lines 105A (105A-1 to 105A-l) connected to terminals 3, to a line 110A connected to the packet switching equipment, while the down switch 107 sends packets received from a line 110B connected to the packet switching equipment 2A to one of the lines 105B (105B-1 to 105B-l) connected to the terminals.

As shown in FIG. 6, the up switch 106 comprises a multiplexer (MUX) 22 for multiplexing a plurality of packet lines 105A-1 to 105A-l, a shared buffer memory (BFM) 21A for temporarily storing packets, an idle address buffer (IABF) 25A which is an FIFO for indicating idle buffer addresses in the BFM, a write address register (WA) 23A for a queuing buffer for an output line (only one line in the up switch), and a read address register (RA) 24A.

Figure 7:
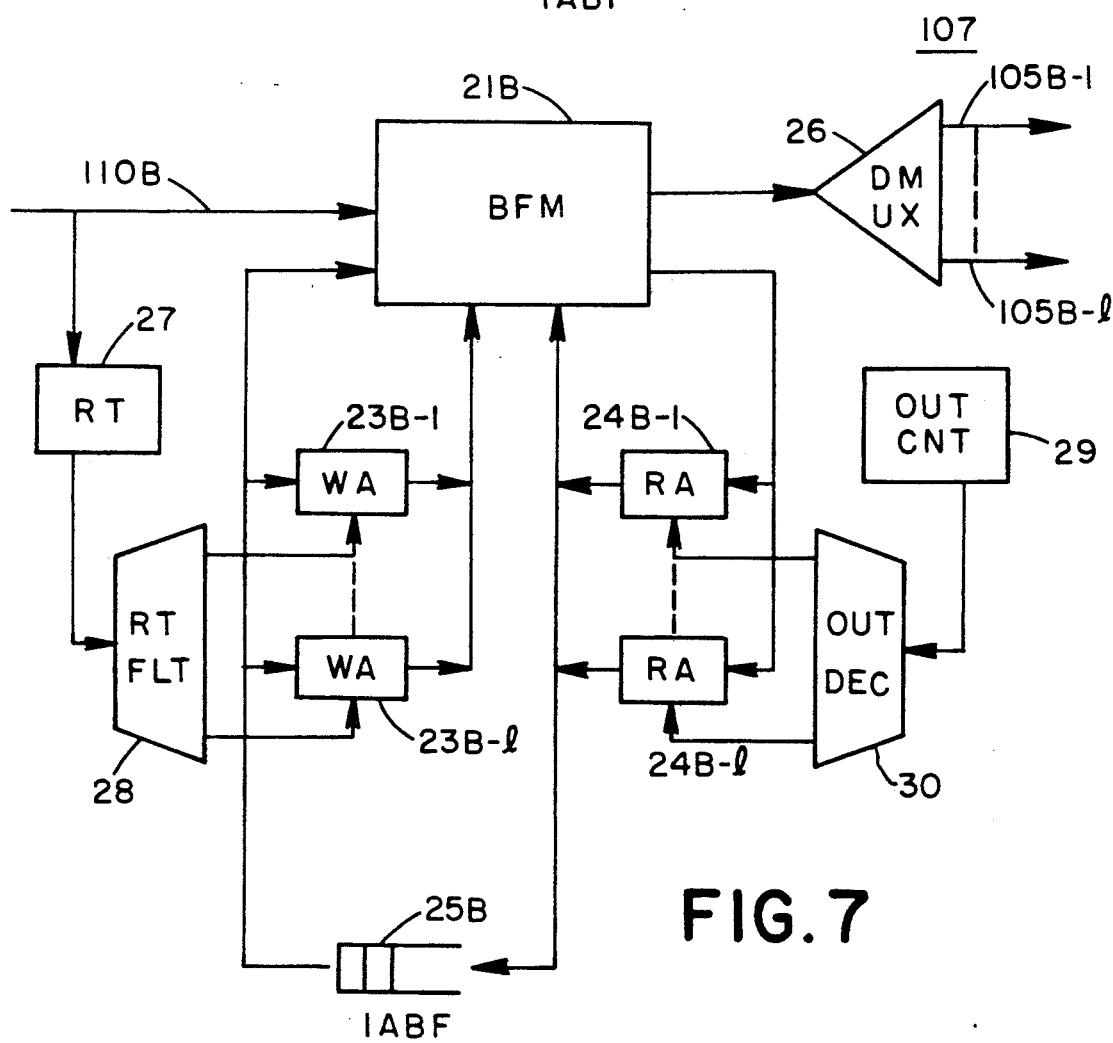

As shown in FIG. 7, the down switch 107 comprises, in addition to a BFM 21B, an IABF 25B, write address registers (WA) 23B-1 to 23B-l, and read address registers (RA) 24B-1 to 24B-l, a routing detector (RT) 27, a routing filter (RTFLT) 28 for selecting one of the write address registers (WA) 23B-1 to 23B-l, an output control counter (OUTCNT) 29 for specifying output line numbers periodically (1 to l), and an output decoder (OUTDEC) 30 for selecting one of the read address registers (RA) 24B-1 to 24B-l.

The shared buffer memory BFM21 (21A and 21B) comprises a next pointer (NP) area 80 and a packet information area 81, as shown in FIG. 10, and each packet is chained at its address by the NP per each output line, respectively. The top address of the chain is set in a read address register RA24 and the last address of the chain is set in a write address register WA23. When packets are received, a hunt idle buffer address is set in the next pointer NP area 80 of the address indicated by the WA23, and when packets are sent, the packet information 81 indicated by RA24 is read.

(3) The structure of the line interface

FIG. 8 is a schematic diagram showing the line interface 12 of lines 100 to which terminals 3 are connected. The upward circuit has an optical electrical signal converter (not shown), a serial-parallel converter (not shown), a line terminating equipment 41A for processing packet line synchronization and other normal terminating functions, a traffic counter 45 for counting packet numbers per logical channel number, and a line number inserter 42 for inserting into a packet header a line number assigned for the line interface. The downward circuit has a line number eliminator 43 for eliminating the line number in the packet header, and line terminating equipment 41B the same as the above-mentioned.

Figure 17:
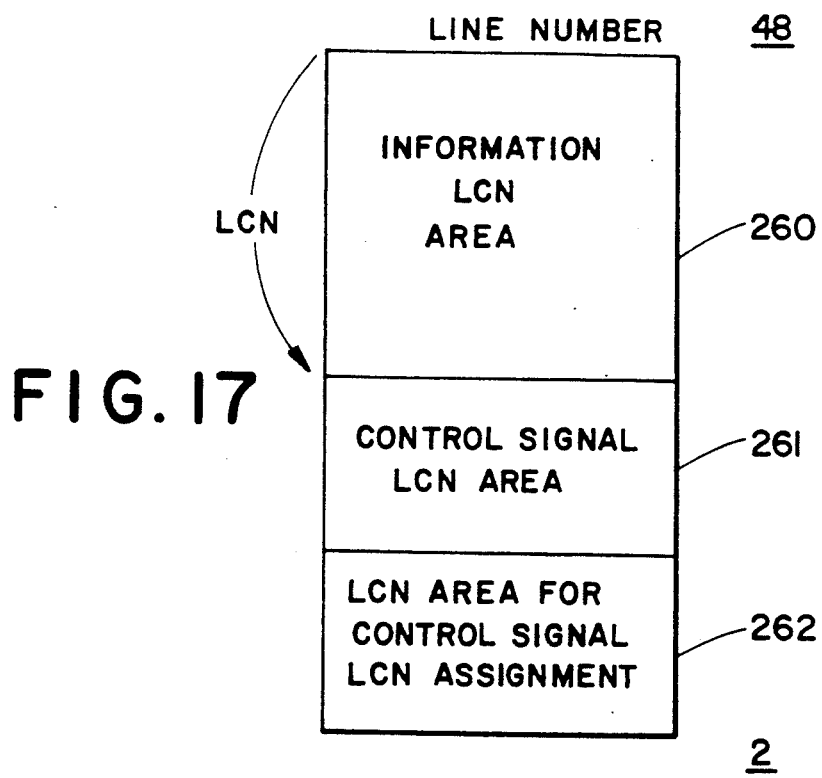
FIG. 17 is a view representing an LCN-to-line number conversion table.

FIG. 9 is a schematic diagram illustrating the circuit formation of a line interface 13 of the lines 120 connected to the switching equipment 2A. The upward circuit comprises a header separator 47 for separating header information, a line number eliminator 52 for eliminating a line number in a packet header, and a line terminating equipment 50A while the downward circuit comprises a line terminating equipment 50B, an LCN separator 49 for separating an LCN in a packet header, and a line number inserter 51 for inserting a line number in a packet header. Also, in the memory, an LCN-to-line number conversion table 48A is provided, the arrangement of which is shown in FIG. 17. In this table, a line number is written for the LCN in the header information separated by the header separator 47 for the up packet, and a line number is read in accordance with the LCN separated by the LCN separator 49 for the down packet.

1.2 Description of the Operation of Embodiment 1

In a packet concentrator 1 in which a plurality of input lines 100 are concentrated on an output line 120 without any function of logical channel switching, i.e., the logical channel is the same both for the input and output on a call, a system is thus provided whereby a down packet (the packet being sent to the terminal 3 from the packet switching equipment 2A through the packet concentrator 1) has the same logical channel as an up packet (the packet being sent to the packet switching equipment 2A from the terminal 3 through the packet concentrator 1). How the signal is outputted to the same line from which said up packet is inputted will subsequently be described with reference to FIG. 11 to FIG. 16 which show the signal sequence diagrams.

For a particular logical channel number (LCN), three different kinds of LCN's are used from the time a call is originated until it is released. These are a packet LCN for transferring user information; an LCN for a signal control packet for a call setup/release and other normal set up and release functions; and, an LCN for a packet of requirement signal for assignment of a control signal at the time of terminal registration.

Figure 11:
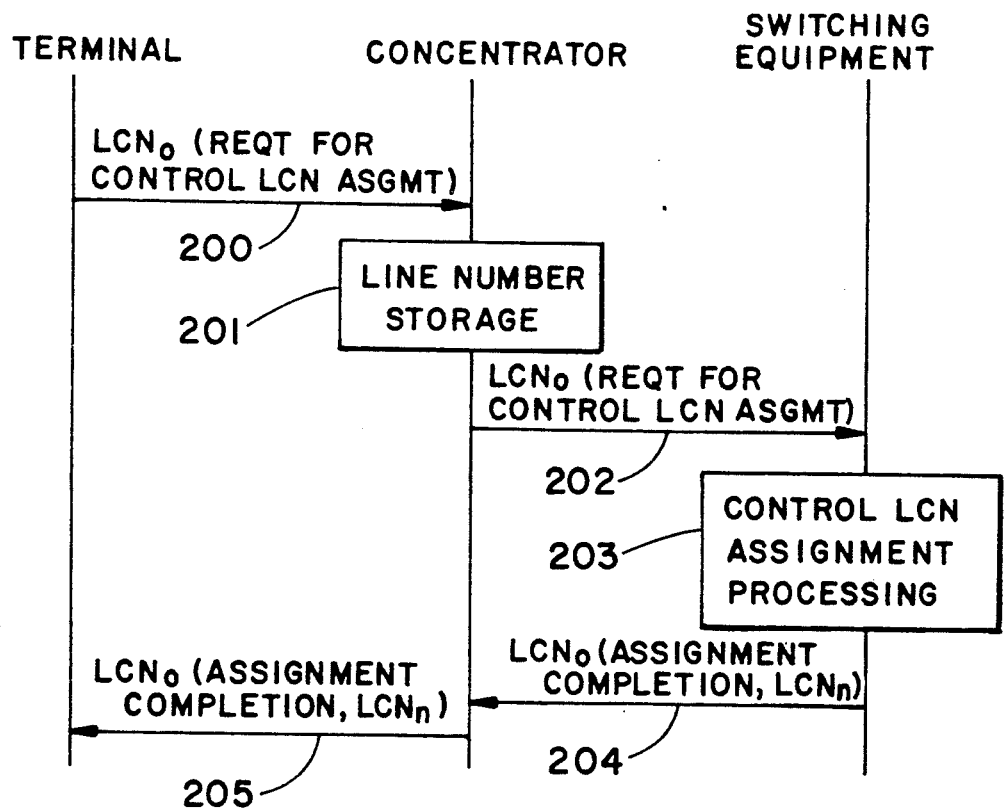
FIGS. 11 to 16 are diagrams showing signal sequences for line number switching in a concentrator.

FIG. 11 is a diagram showing a signal sequence for terminal registration. When a terminal 3 is connected to a network, the terminal 3 sends a packet of requirement signal for LCN assignment for signal control 200 to the concentrator 1 using the $LCN_0$ for assigning a control LCN predetermined by the packet switching equipment 2A.

The composition of a packet in the line 100 between the terminal 3 and the packet concentrator 1 is shown in FIG. 3. The packet is separated for header information and user information, and the header information includes the LCN ($LCN_0$) and the user information includes a signal classification SIG (requirement signal for LCN assignment of control signal).

When this packet is inputted to the line interface 12 in FIG. 2, the line interface 12 inserts a line number LN assigned in advance to the packet header information by the line number inserter 42 subsequent to the termination of the inputted signal in the line terminator 41 and the counting of numbers of passing packets by the traffic counter 45, both shown in FIG. 8.

Figure 4:
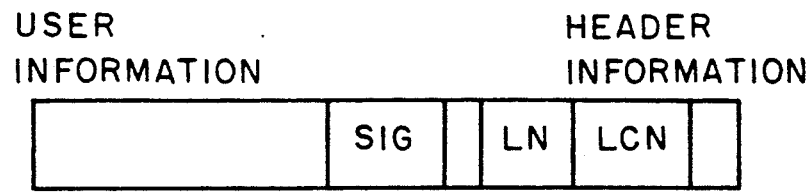

The composition format of a packet with an inserted LN is shown in FIG. 4. This packet is sent to the up switch 106 of the packet switch 11 through the line 105A.

In the up switch 106 (FIG. 6) of the concentrator packet switch 11, an idle address of the shared buffer memory BFM 21A is taken out of the idle address buffer IABF 25A after the inputted packet is multiplexed by the multiplexer MUX 22. Next, the write address register (WA) 23A is read, and the idle buffer address thus taken out is set up in the next pointer NP 80 (FIG. 10) at an address in the BFM 21A indicated by WA 23A. At the same time, the input packet information is written in the packet area 81 of the idle buffer address, and the WA 23A is renewed with the idle buffer address. Also, during the time of sending the packet, simultaneously with the sending of the packet area information 81 in the BFM 21A indicated by the RA 24A, the NP 80 of the terminating packet is set up in the RA 21A and the address of the packet already sent is inputted in the IABF 25A.

The packet is inputted to the line interface 13 in FIG. 2 through the line 110A to take out the LCN and the line number LN of the header information shown in FIG. 4 by the header separator 47 shown in FIG. 9, and to write the line number LN for the LCN on the LCN-to-line number conversion table 48A which comprises data as shown in FIG. 17. In this case, the line number LN is set up in the area for LCN 262 for assigning a control signal LCN. The above-mentioned packet is sent to the higher switching equipment 2A through the line number eliminator 52 for eliminating the line number LN in the packet header, the line terminator 50A, and the line 120A. The packet in the line 120A has a format as shown in FIG. 3.

When a down packet of an LCN assignment terminating signal 204 having the same LCN is inputted to the line interface 13 shown in FIG. 9 from the switching equipment 2A through the line 120B, the LCN ($=LCN_0$) is taken out by the LCN separator 49. From this LCN, a line number LN for the $LCN_0$ of the LCN-to-line number conversion table 48A is read, and is inserted into the packet information by the line number inserter 51 and is sent to the line 110B. The packet in the line 110B has a format shown in FIG. 4.

When this packet is inputted to the down switch 107 of the packet switch 11 shown in FIG. 7, a routing information reader RT 27 takes out the line number information LN (corresponding to 105B-1 to 1) from the packet header information shown in FIG. 4, and reads the WA 23B for the LN by a routing distributor RTFLT 28 in accordance with such information, and then, sets up the idle buffer address taken out from the IABF 25B in the address next pointer (NP) 80 in the BFM 21B indicated by the WA 23B in the same manner as in said up switching operation, while at the same time writing the inputted packet on the packet area 81 of the idle buffer address to renew the address of WA 23B.

At the time of sending a packet, the output decoder OUTDEC 30 selects an RA 24B for an output line in accordance with the information whereby an output control counter OUTCNT 29 outputs periodically a 1 to 1 value as an output line number, and sends a packet in the BFM 21B indicated by this RA 24B to a corresponding output line through a demultiplexer 26. Also, an NP 80 information at the same address as a sending packet is set up in the RA 24B, and the address of the packet already sent is inputted in IABF 25B simultaneously. Therefore, an LCN assignment terminating signal 204 having the LCN for the control signal hunted by the switching equipment 2A shown in FIG. 11 as a parameter can be returned through the concentrator to a terminal 3 from which the assignment requirement is originated.

Figure 12:
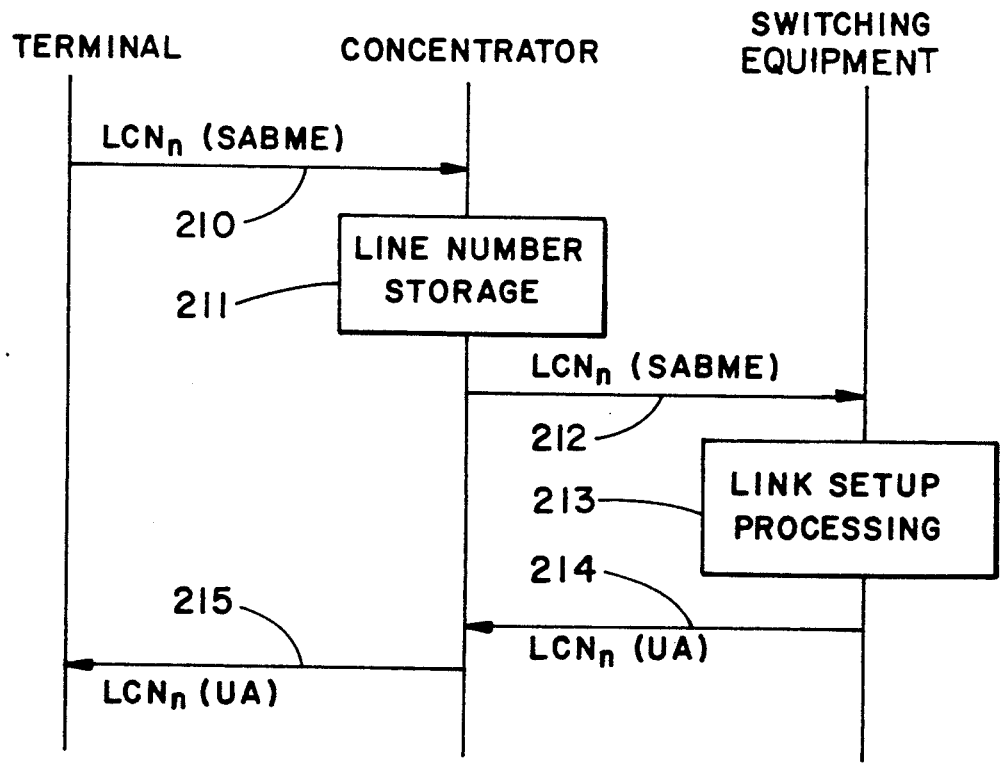

FIG. 12 is a diagram showing a signal sequence for setting the up link to process a call. The terminal 3 sends a requirement signal for link setup (SABME) 210 to the switching equipment 2A through the concentrator 1 by use of the LCN for the control signal assigned as above. The terminating packet at the concentrator 1 is sent to the switching equipment 2A through the line interface 12, the packet switch 11, and the line interface 13 shown in FIG. 2, respectively. At this time, as described previously, the line interface 13 shown in FIG. 2 stores a line number LN in the area for LCN control signal in the LCN-to-line number conversion table 48 shown in FIG. 9. When a link setup terminating signal (UA) 214 is inputted to the concentrator 1 from the switching equipment 2A, the line interface 13 shown in FIG. 2 takes out a line number from the LCN-to-line number conversion table 48, and inserts such number in a packet to be returned through the packet switch 11 to the terminal 3 from which the requirement for the link setup is originated.

Figure 13:
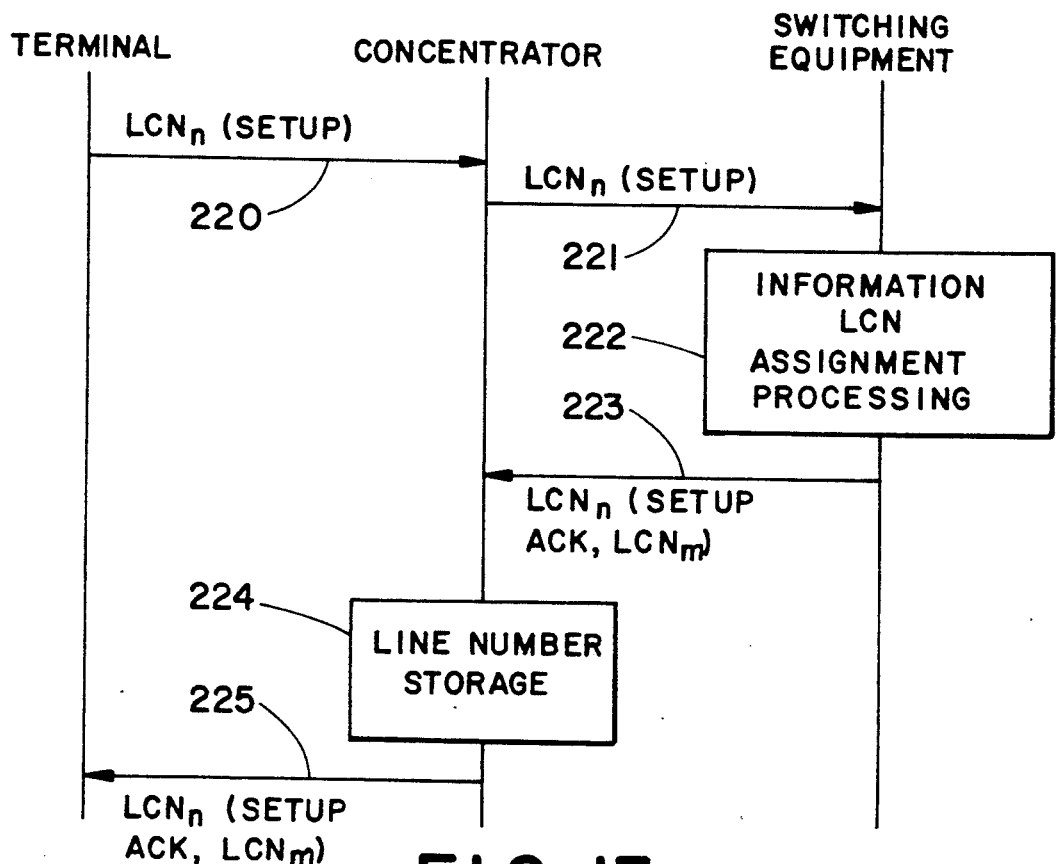
Figure 14:
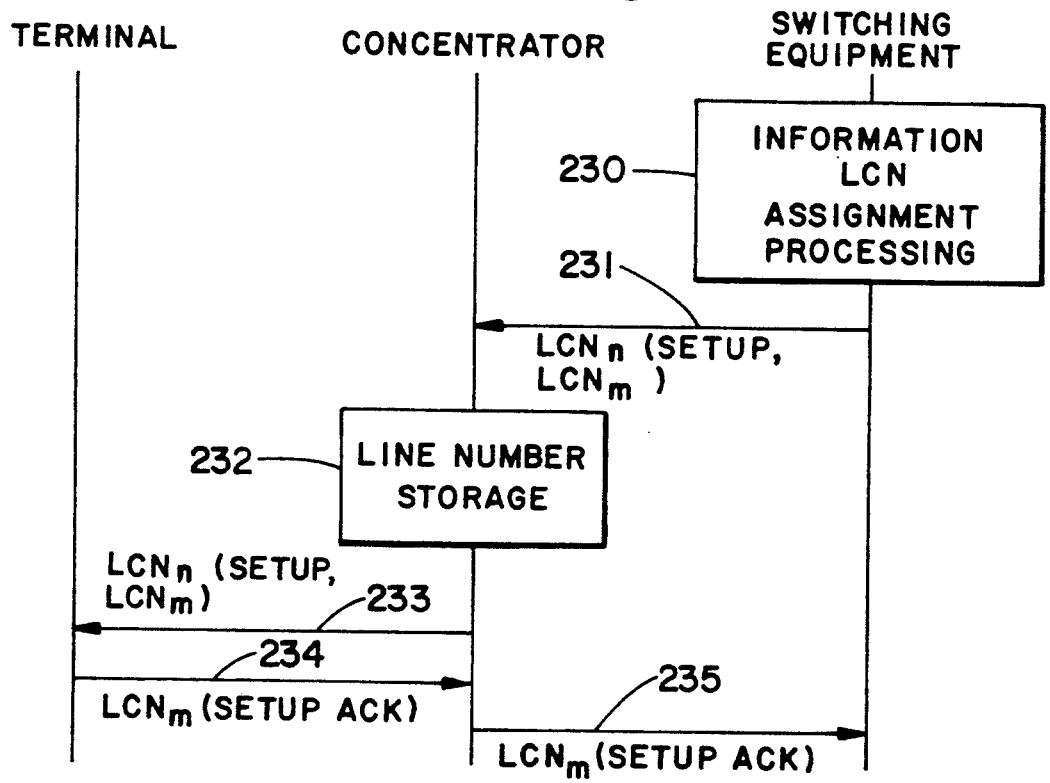

A phase of call setup shown in FIG. 13 (sending side) and FIG. 14 (terminating side) can also identify, as described above, a line to which said terminal 3 is connected in accordance with a line number LN for the LCNn for the control signal stored in the switching equipment 2A.

Figure 15:
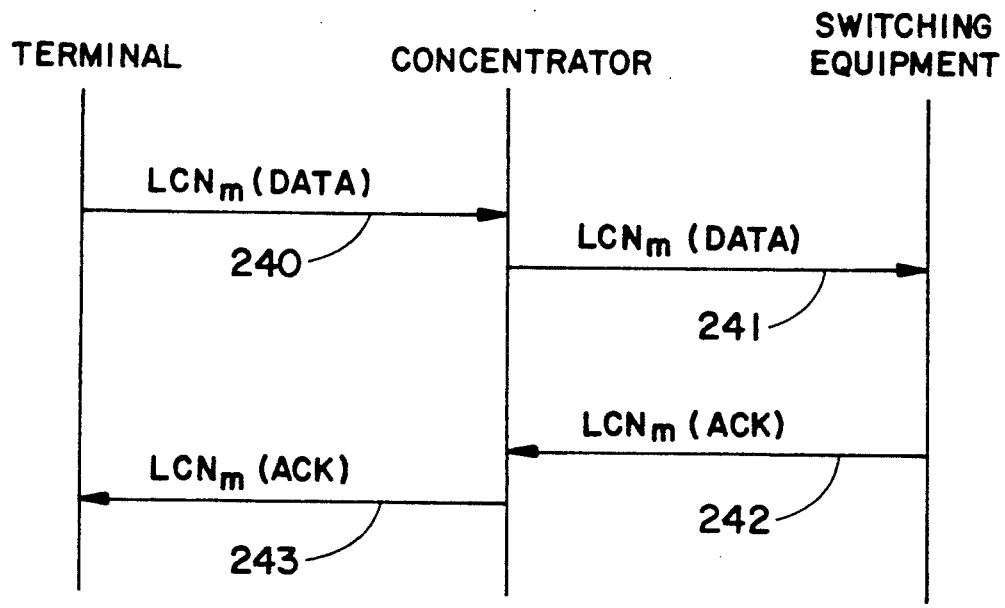
Figure 16:
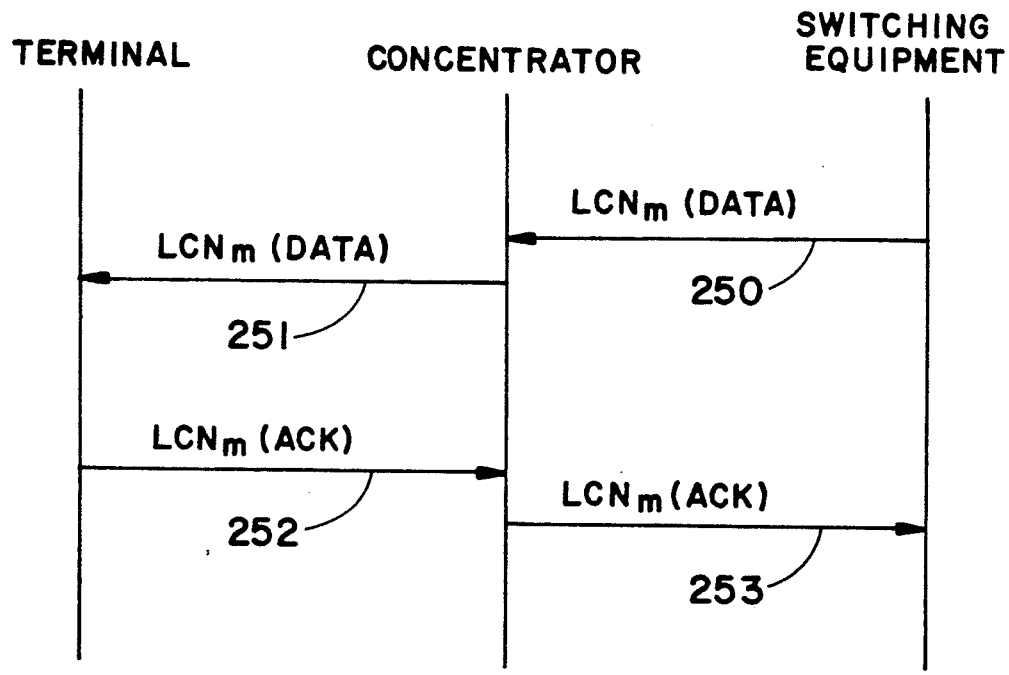

The information packet which is transferred subsequent to a call setup does not terminate at the switching equipment 2A so that a line number for the information LCN must be stored at the time of the call setup. At the time of a call setup, the switching equipment sends an LCNm for the hunted information to the concentrator 1 as a parameter for a SETUP ACK message 223 shown in FIG. 13 or a SETUP message 231 shown in FIG. 14. The concentrator 1 expands the packet taken out in the LCN separator 49 of the line interface shown in FIG. 9 to cover its signal classification and parameter, and if the signal classifications are SETUP ACK and SETUP, the separator reads a line number from the LCNn for the control signal in the packet header by the LCN-to-line number conversion table 48, and sets up this line number at the address (in the area for the information LCN) of the LCNm in the parameter of the message. In this way, the information packets of LCNm being transferred hereinafter from the switching equipment 2A, for example, the ACK as shown in FIG. 15 and the data shown in FIG. 16, are sent to the line 100 connected to the terminal 3 from which the requirement for connection is originated.

Embodiment 2

2.1 Description of the architecture of Embodiment 2

(1) The network formation

The network to which the present invention is applied has the same formation as the Embodiment 1 shown in FIG. 1.

According to the present invention, the packet concentrator 1 has a feature that by inserting a line number LN between the terminal 3 and the packet concentrator 1 into the packet header of a packet as shown in FIG. 4, being communicated on the line between the packet concentrator 1 and the packet switching equipment 2A, a function can be provided for sending a down packet outputted from the packet switching equipment 2A to the line (one of the lines 100) in which a packet having the same logical channel number LCN as this packet is inputted.

(2) The structure of the packet switch

The packet switch has the same structure as the packet switch of Embodiment 1.

(3) The structure of the line interface

Figure 19:
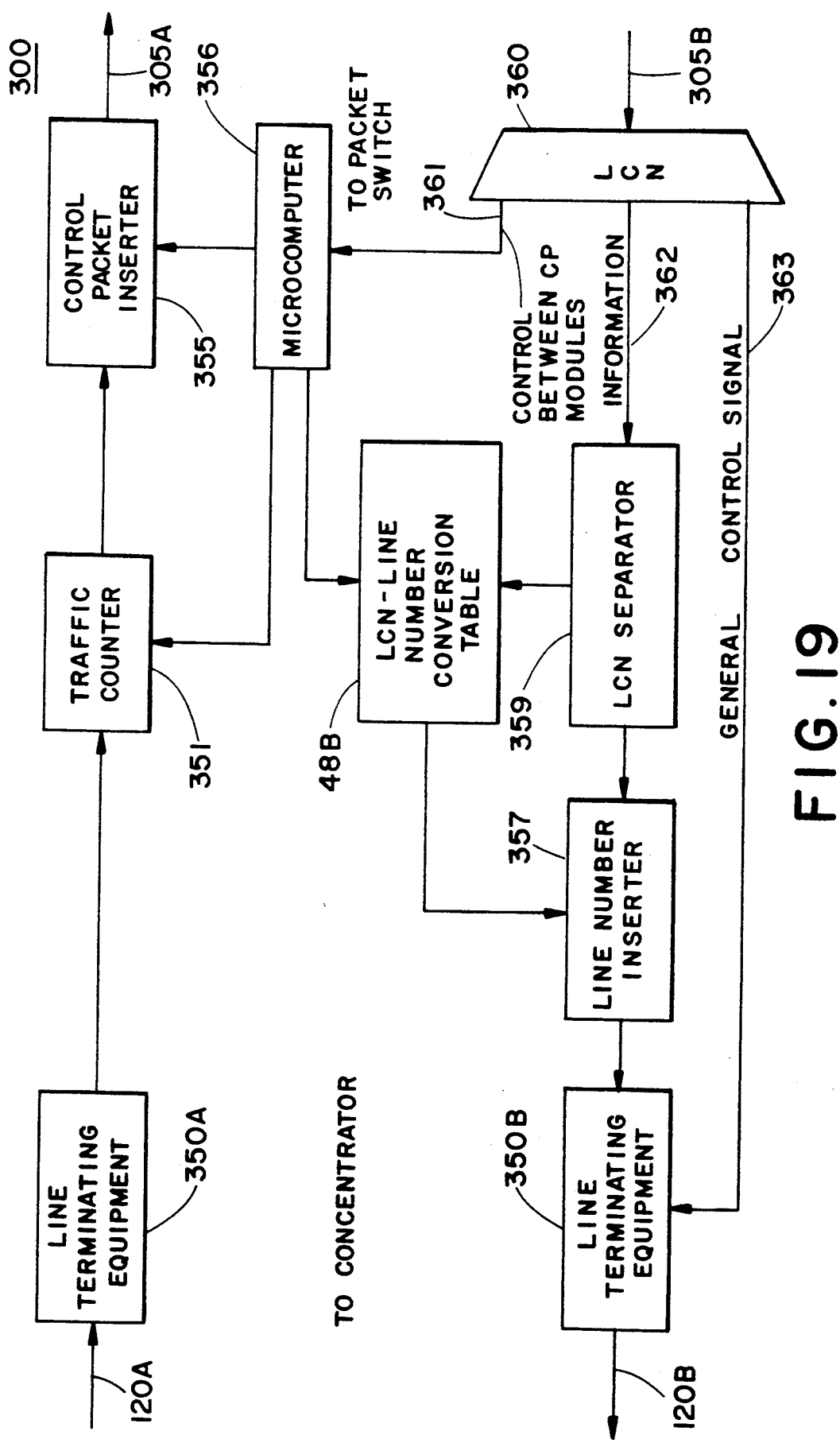
FIG. 19 is a schematic diagram showing an example of the structure of a line interface in a packet switching equipment.

In the packet concentrator 1, the line interface differs from the one in Embodiment 1 in that the line number controller 53 comprising the header separator 47, the line number eliminator 52, the LCN separator 49, the line number inserter 51 and the LCN-to-line number conversion table in the line interface 13 (FIG. 9) connected to the packet switching equipment 120 are removed from its structure. The structure of a line interface 300 (FIG. 18) connected to the packet concentrator 1 in the packet switching equipment 2 is shown in FIG. 19.

In the upward circuit, there are provided a photo/electric signal converter (not shown), a serial/parallel converter (not shown), a line terminator 350A for processing the packet line synchronization and others, a traffic counter 351 for counting packet numbers per logical channel number, and a control packet inserter 355 for sending control signals to a CP module. In the downward circuit, there are provided an LCN distributor 360 for conducting branches by the LCN in a packet header, an LCN separator 359 for separating an LCN from the packet header, an LCN-to-line number conversion table 48B for setting up a line number for the LCN, a line number inserter 357 for inserting a line number into the packet header, and a line terminator 350B. The LCN distributor 360 sends a packet to the microcomputer 356 through the line 361 in the control LCN between CP modules; to the LCN separator 359 through the line 362 in the information LCN; and to the line terminator 350B through the line 363 in the control LCN for general control signals.

(4) The structure of the CP module

Figure 26:
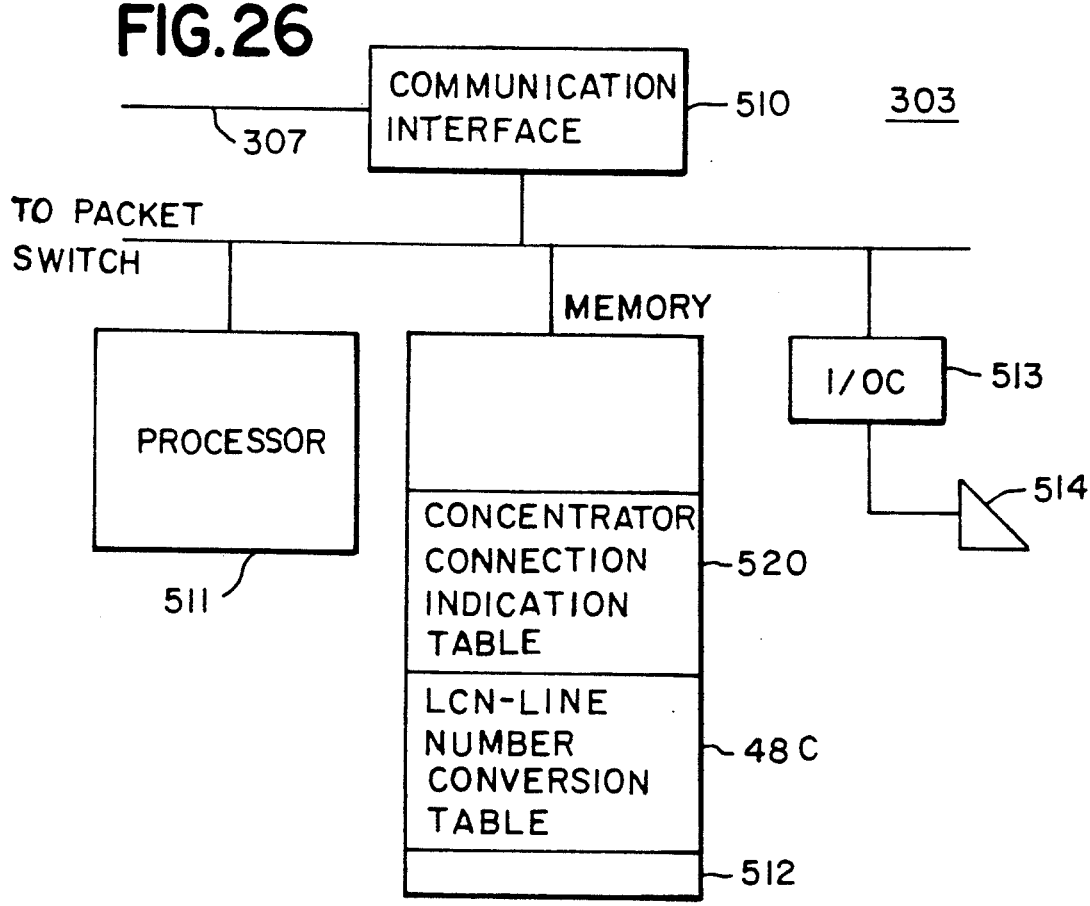
FIG. 26 is a schematic diagram showing an example of the structure of a CP module in a packet switching equipment.

As shown in FIG. 26, the CP module 303 in the packet switching equipment 2 comprises a communication interface 510 for communicating control signals by the ATM, a processor 511 for executing the call setup/-maintenance and administration processing and others, a memory 512, and I/O controller 513 and I/O device 514 such as typewriter.

2.2 Description of the operation of Embodiment 2

In a network in which the same logical channel is used for the input and output of the packet concentrator 1, a line number LN connected to a terminal 100 contained in the concentrator 1 is inserted into a packet by the concentrator 1 for up information and by the higher packet switching equipment 2A for down information. By sending a packet including a line number between the concentrator 1 and the switching equipment 2A, a down packet having the same logical channel as an up packet can be outputted by said concentrator 1 to the same line as the one in which said up packet is inputted. This operation will subsequently be described with reference to the signal sequence diagrams shown in FIG. 20 to FIG. 25.

Figure 20:
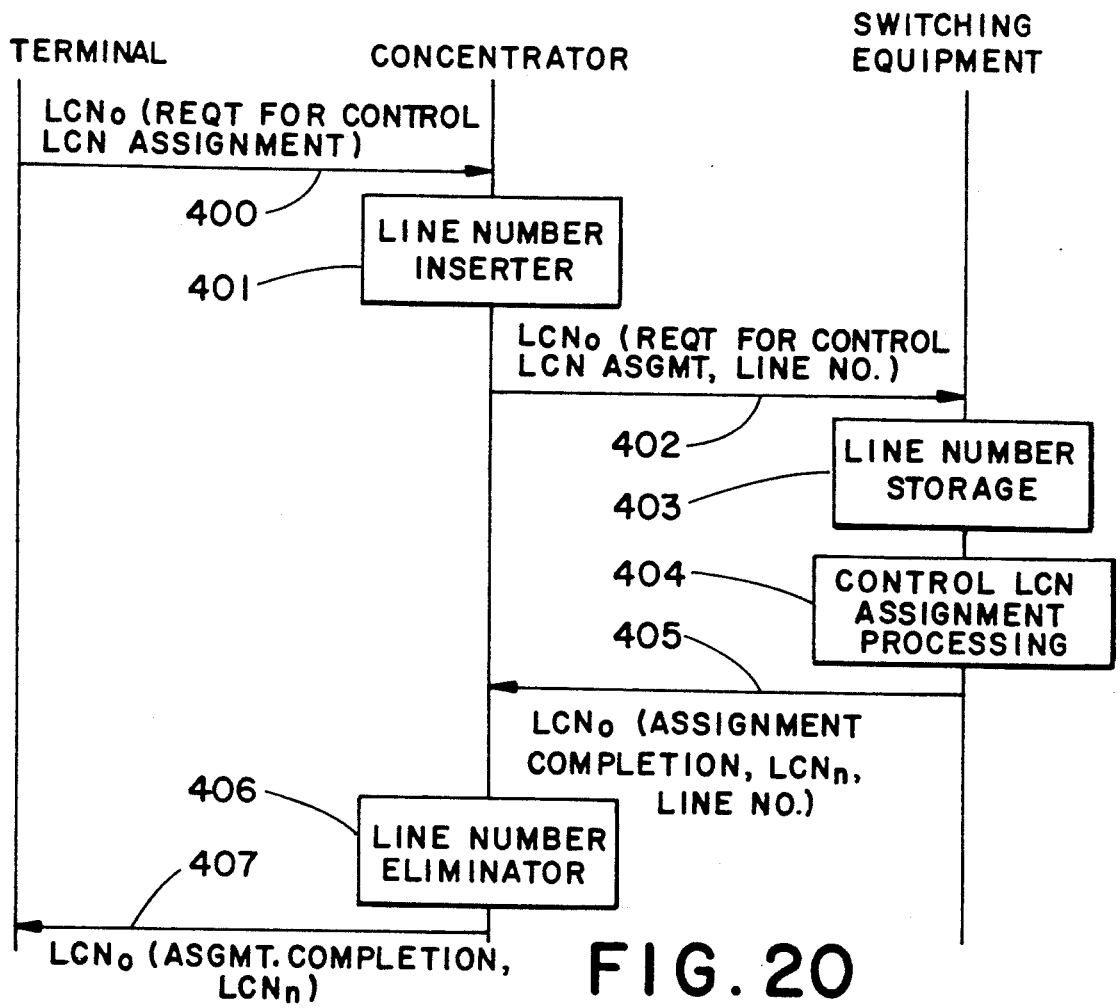

FIG. 20 represents a terminal registration phase, and when the concentrator 1 receives a requirement signal for LCN assignment for control signal 400 from the terminal 3, a line number LN is inserted into a packet header in the line interface 12 shown in FIG. 2. Then, the packet is sent to the switching equipment 2A through the packet switch 11 and the line interface 13. However, in the line interface 13, any access to the LCN-to-line number conversion table, line number elimination/insertion, and others are conducted. The line number controller 53 shown in FIG. 9 is removed in the structure of this embodiment. Therefore, the packet format in the packet line 120A between the concentrator 1 and the switching equipment 2A is the one having the line number LN included in the packet header as shown in FIG. 4.

When this packet is inputted in the switching equipment 2 shown in FIG. 18, it is sent to the CP module 303 through the line interface 300 and the packet switch 302. The processor 511 shown in FIG. 26 writes the line number LN inserted in the packet on the LCN area 262 for LCN assignment of the control signal of the LCN-to-line number conversion table 48C shown in FIG. 17 in the memory 512, and sends a signal terminating packet for LCN assignment of the control signal 405 with the line number being included in the header to the line interface 300 through the packet switch 302 after hunting the LCN for the control signal. The line interface 300 shown in FIG. 19 sends the above-mentioned packet to the concentrator 1 through a line 363 by an LCN distributor 360 because the LCN of the above-mentioned packet is a general control signal. At this time, the packet has the format shown in FIG. 4. The packet switch down circuit 107 in the concentrator 1 sends the terminating signal 407 for LCN assignment for control signal to the line (one of those lines 105B) indicated by the LN in the packet header information as in the Embodiment 1.

Figure 21:
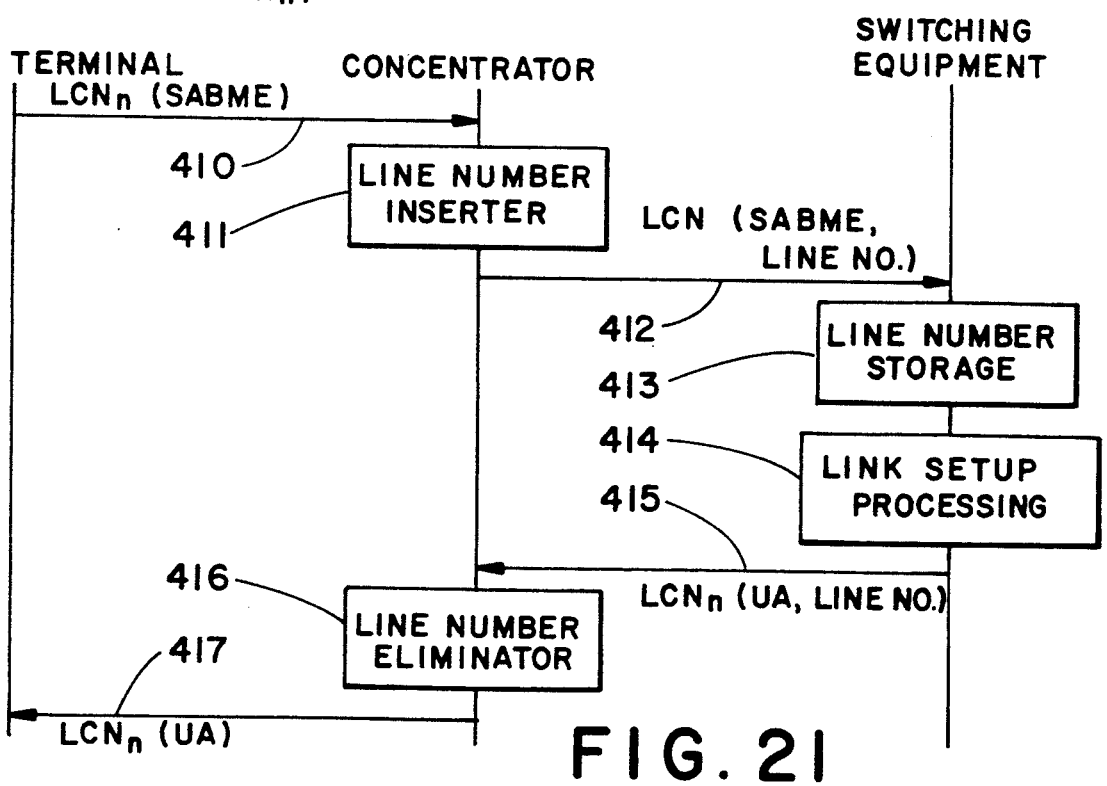

FIG. 21 illustrates a phase of link setup. As in the terminal registration phase, a line number LN is inserted into a packet of the setup requirement signal SABME 410 in the concentrator 1. The switching equipment 2A sets up the line number LN in the area for an LCN control signal of the LCN-to-line number conversion table 48C. The switching equipment 2A obtains the line number LN from this table 48C at the time of sending the setup terminating signal UA 415, and inserts such number in the packet header. Thus, the above-mentioned packet can terminate itself at said terminal 3 from which the SABME packet is sent through the concentrator 1.

A phase of call setup shown in FIG. 22 (originating side) and FIG. 23 (terminating side) can also identify as set forth above a line to which said terminal 3 is connected by the line number LN for LCNn for a control signal stored in the switching equipment 2A. For information packets 440, 442, 443, and 445 (FIG. 24) which are transferred after the call setup, it is necessary to store the line number for information LCN at the time of call setup because these packets do not terminate in the switching equipment 2A. When a call is originated from the terminal 3, a SETUP signal 420 terminates at the concentrator 1 as shown in FIG. 22, and a SETUP signal 422 is sent to the switching equipment 2A subsequent to the insertion of an LN in the packet header in the concentrator 1 as in the case of the terminal registration phase. After receiving the SETUP signal, the switching equipment 2A hunts an LCNm for information, and takes out the line number LN obtainable from the LCN-to-line number conversion table 48C by the LCN (LCNn) for control signal, and then, includes it in the packet of which the switching equipment notifies said line interface 300 through the packet switch 302, and writes it in the area 260 for an LCN information of the LCN-to-line number conversion table 48B. This packet is distributed to the line 361 by the microcomputer 356 by the LCN distributor 360 using a special LCN for control signal between the CP module 303 and the line interface 300, and is written on the LCN-to-line number conversion table 48B by the microcomputer 356. Then, the switching equipment 2A sends a SETUP response signal 425 to the concentrator 1 for eliminating the LN, and sends a SETUP response code 427 to the terminal 3. Thus, the call setup is completed.

Figure 24:
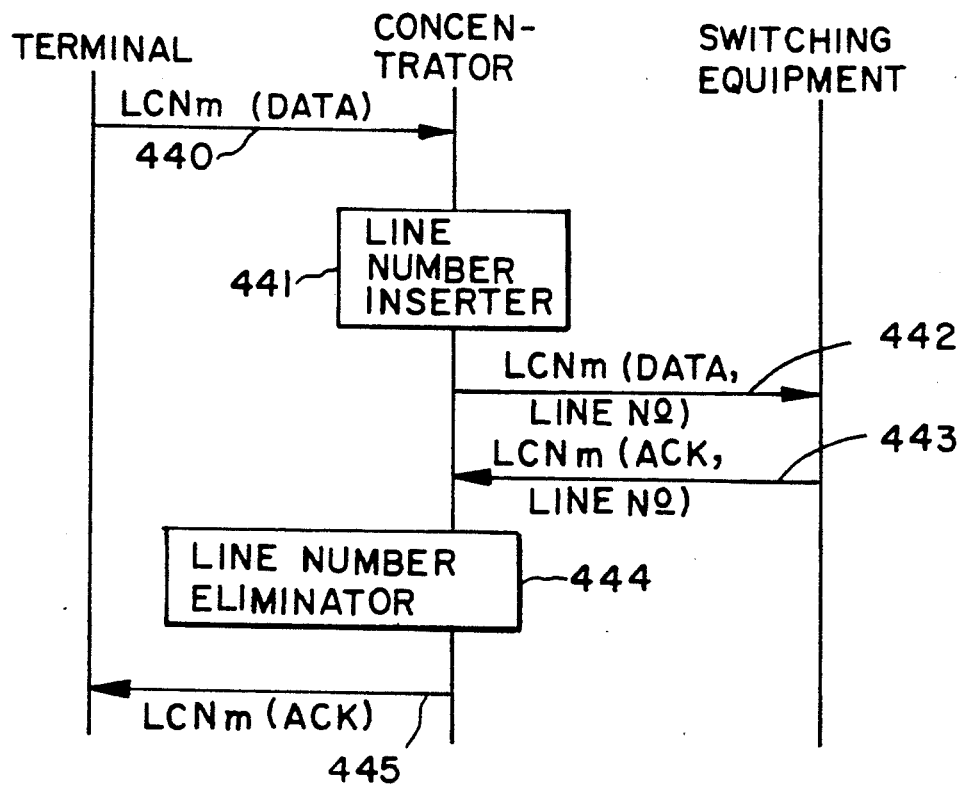
Figure 25:
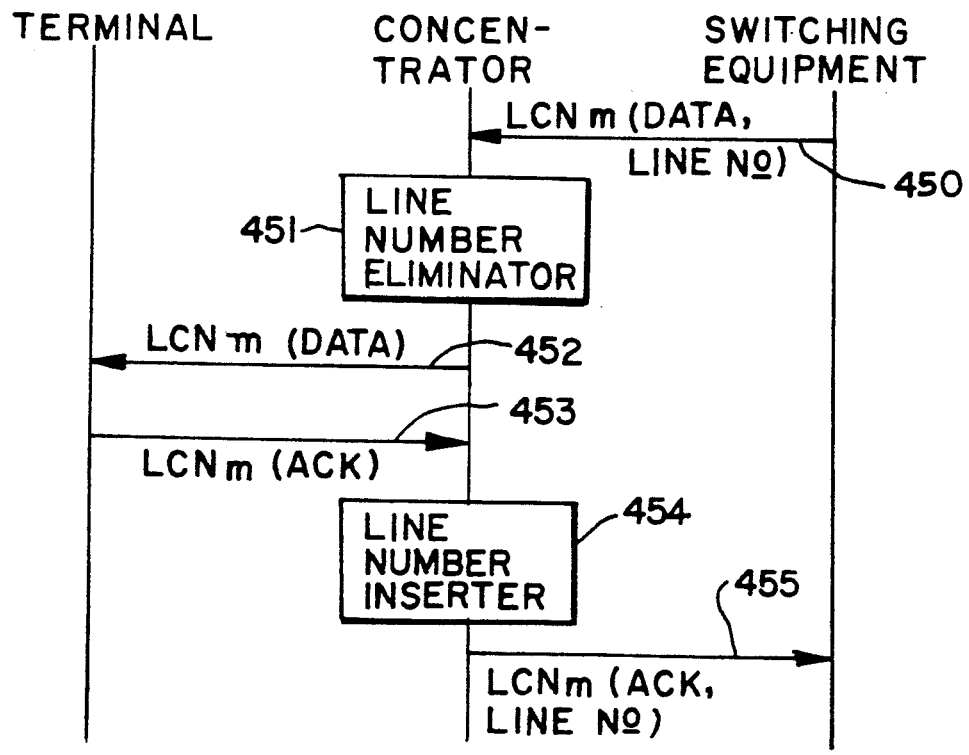

FIG. 24 represents the information packets (440, 442, 443, and 445) which are transferred after the call setup. In the information packet (for example, ACK 443 in FIG. 24) from the packet switch 302 inputted in the line interface 300, an LCN is read by the LCN separator 359 through the line 362 by the LCN distributor 360; a line number LN is taken out by the LCN-to-line number conversion table 48B; and a line number LN is inserted into the packet header by the line number inserter 357.

The switching equipment 2 hunts an information LCNm after determining the terminating user in accordance with the protocol shown in FIG. 23 for a terminating call at the terminal 3, and sends this LCNm and a line number LN to the line interface 300 by use of an LCN for control signal between the CP module 303 and the line interface 300, and sets them up in the information LCN area 260 of the LCN-to-line number conversion table 48B as in the processing previously described. Then, the SETUP signal 432 is sent to the concentrator 1 in which an LN is eliminated, and in turn, the SETUP signal 434 is sent to the terminal 3. The response signal, SETUP ACK signals (435 and 437) are returned from the terminal 3 to the switching equipment 2A through the concentrator 1 for the setting up of a call. In this way, when the switching equipment 2A sends data 450 to the concentrator 1, it can also insert an LN into the packet at the phase of information transfer shown in FIG. 25 (terminating side), and the concentrator 1 can only send data 452 to the line connected to the terminal 3 for which the receiving is proper.

Embodiment 3

3.1 Description of the architecture (1) The network formation

Figure 27:
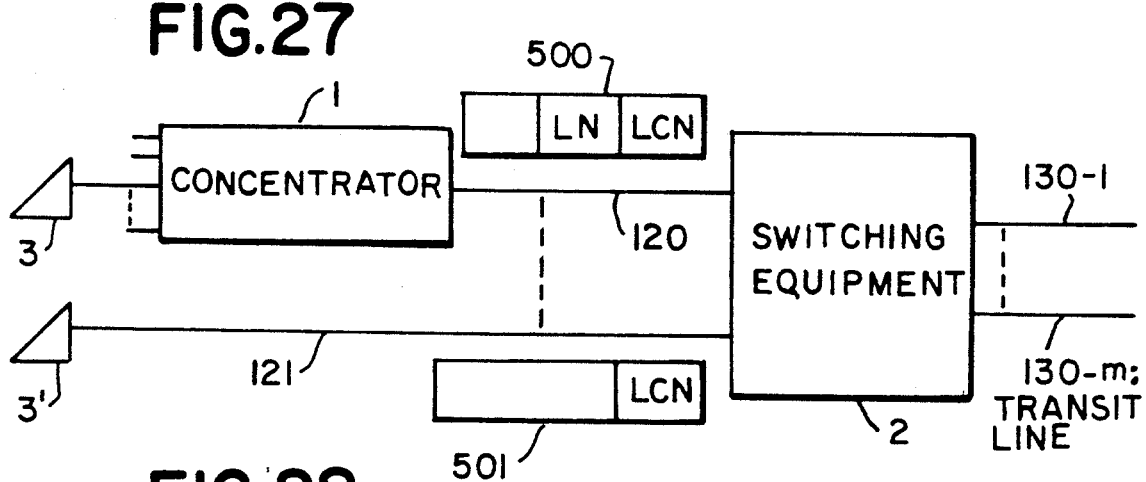
FIG. 27 is a view showing an example of the structure of a network in which a packet switching equipment contains connection/non-connection lines to a concentrator.

An example of the network to which the present invention is applied is shown in FIG. 27. In the packet switching equipment 1, the network is formed to comprise both a line 120 connected to the packet concentrator 1 and a line 121 to which a terminal is directly connected. A format 500 on the line 120 has a line number LN included in its header, and in a packet 501 on the on line 121, the line number LN is not included.

(2) The structure of the packet switch

The structure of the packet switch is the same as the one described in the embodiment 2.

(3) The structure of the line interface

Figure 29:
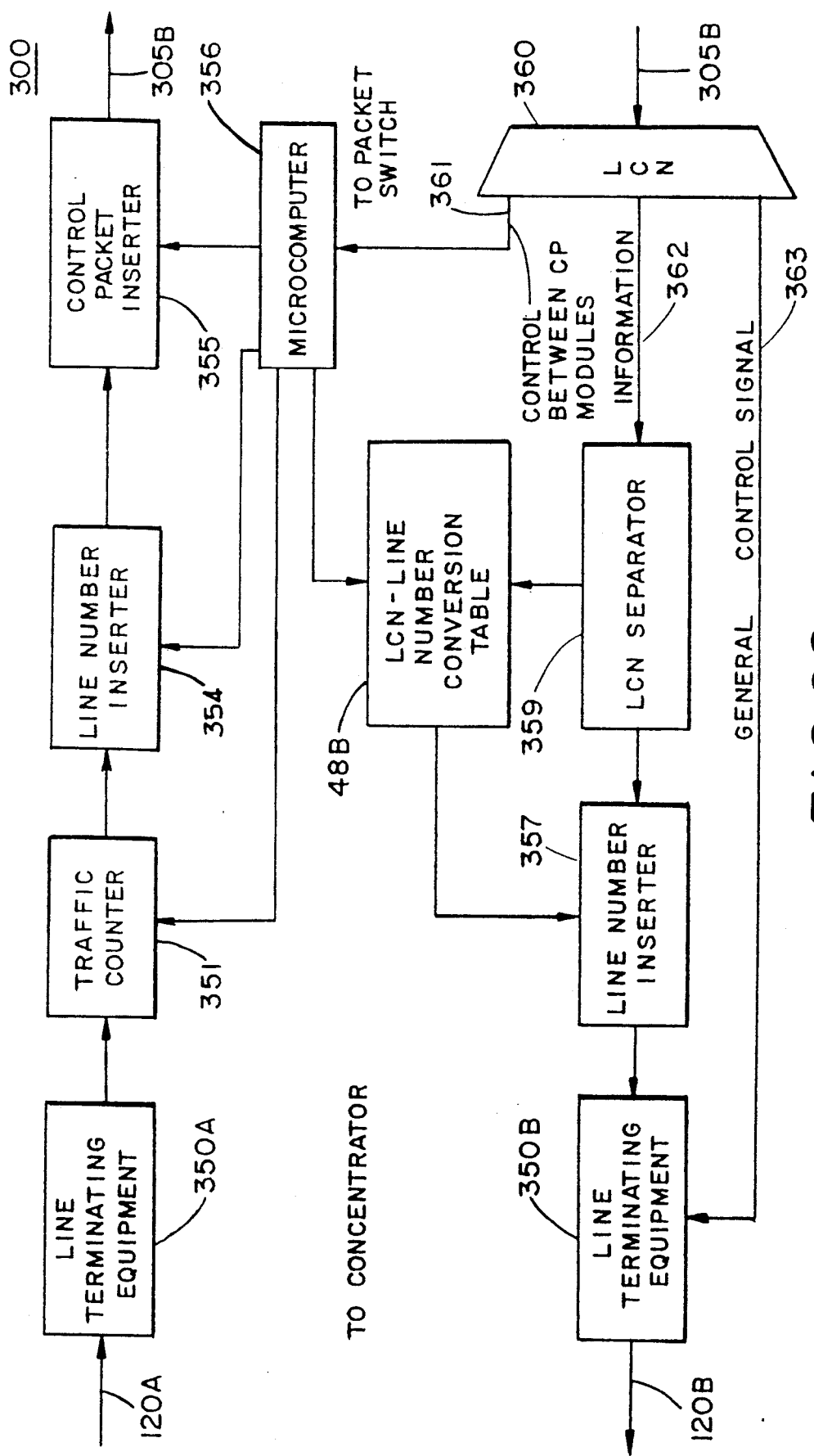
FIG. 29 is a schematic diagram showing the structure of line interface in a packet switching equipment.

The structure of the line interface 300 connected to the packet concentrator 1 in the packet switching equipment 2 is shown in FIG. 29. As compared with the structure shown in FIG. 19 in Embodiment 2, a photo/electric signal converter (not shown), a serial/parallel converter (not shown), a line terminator 350A for processing of packet line synchronization and other needs, a traffic counter 351 for counting the packet numbers per logical channel number, and a control packet inserter 355 for sending control signals to the CP module are provided in the upward circuit of this interface. Also, a line number inserter 354 is added for inserting a line number into the packet header in accordance with the instruction from the microcomputer 356. The other line interfaces are the same as Embodiment 2.

(4) The structure of the CP module

The structure of the CP module is the same as the one described in the embodiment 2.

3.2 Description of the operation of Embodiment 3

Figure 28:
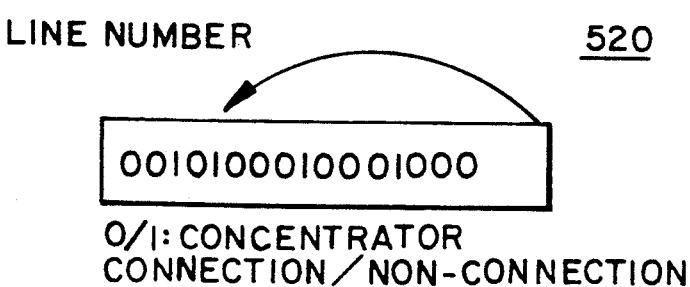
FIG. 28 is a view representing an example of a concentrator connection indication table.

FIG. 27 illustrates the network having the switching equipment 2 containing both the line 120 connected to a terminal 3 through the concentrator 1 in which a line number is inserted into a packet header as shown in the description of Embodiment 2, and also a line 121 connected directly to a terminal 3' without an intermediate concentrator. Among the packets inputted in the switching equipment 2, the one passing through the concentrator 1 has a line number LN included in the packet header, and the one directly inputted from the terminal 3' does not have any line number LN included in the packet header. In order to achieve an operation result which would be the same as the above-mentioned Embodiment 2, it is necessary to insert a line number LN into the header information for a packet inputted directly from the terminal 3' without a concentrator 1 in the switching equipment 2. The insertion of a line number LN is carried out by the line number inserter 354 shown in FIG. 19 in the line interface 300 to which the terminal 3' is directly connected. However, it is unnecessary to insert an LN into any packet on the line 120 connected to the concentrator 1, only those that are directly connected to the switching equipment need the insertion. Therefore, a concentrator connection indication table 520 shown in FIG. 28 is provided in the memory 512 in the CP module 303. The above-mentioned table shows by a one bit indicator against a line whether or not the concentrator 1 is connected. In this example, the status in which the concentrator is connected is represented by 0, and the non-connection status by 1. At the time of contacting the switching equipment, the processor 511 sends the data for a line to the line interface 300 as control signals between the CP module and the line interface through the communication interface 510 and the packet switch 302 shown in FIG. 18. In the line interface 300 in FIG. 29, the microcomputer 356 receives this packet through the LCN separator 360 and the line 361, and executes an ACT/INACT for the line number inserter 354 by examining whether or not a line number is inserted into the inputted packet.

When lines are increased and a concentrator is newly set, maintenance personnel input a maintenance command by the typewriter 514, and then, the processor 511 rewrites the concentrator connection indication table 520 for the same operation as previously described subsequent to the notification of this information to the line interface 300.

Embodiment 4

4.1 Description of the architecture

The formation of the network, the structure of the packet switch, the structure of the one interface, and the structure of the CP module are the same as each of those described in Embodiment 2.

4.2 Description of the operation

The packet switching equipment 2 shown in FIG. 18 operates an information volume based accounting system (for charging by the numbers of communication packets) for a line number by use of the line number inputted by the packet header under the system according to Embodiment 2.

Figure 30:
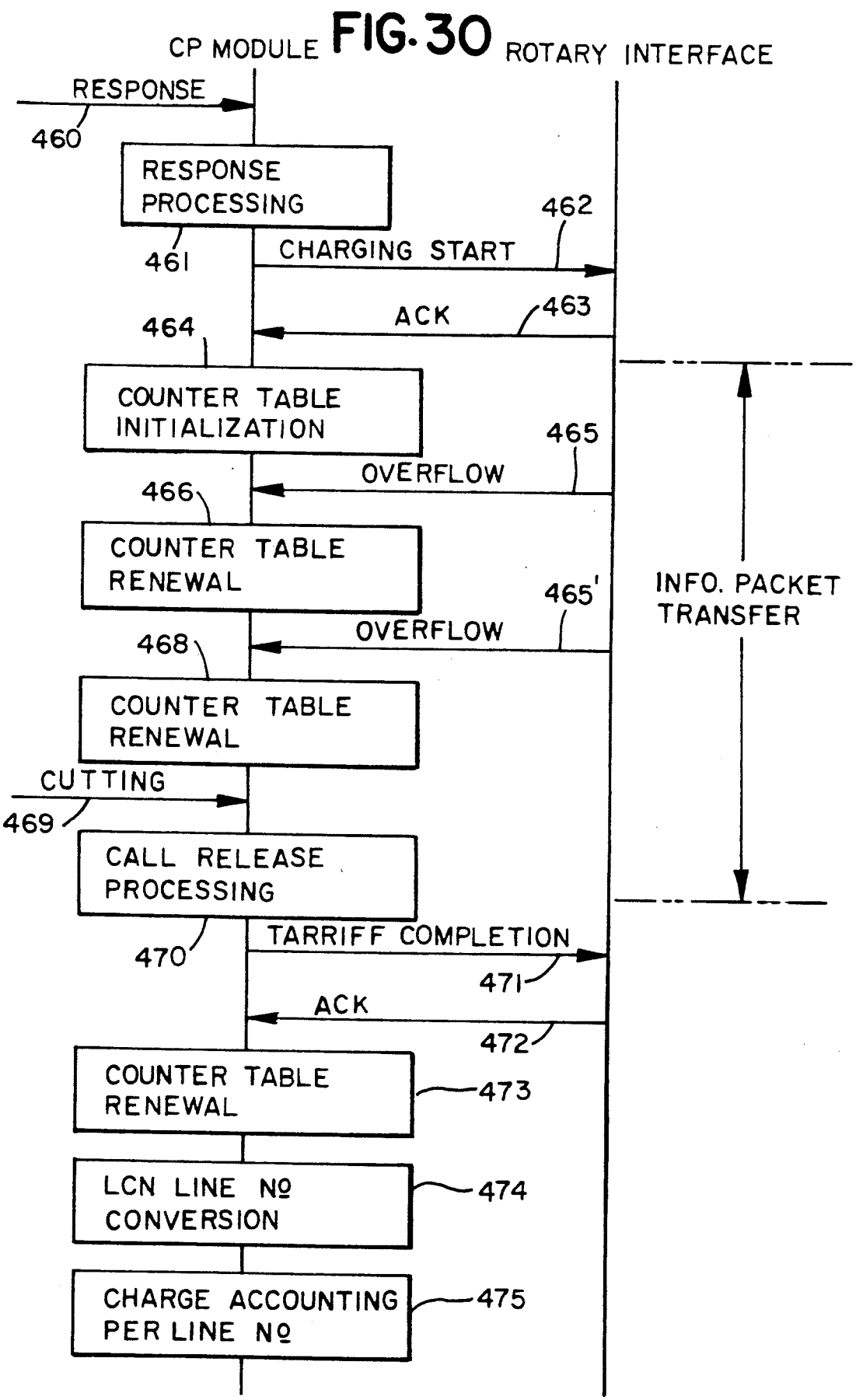
FIG. 30 is a view showing signal sequences for tariff control by a CP module.
Figure 31:
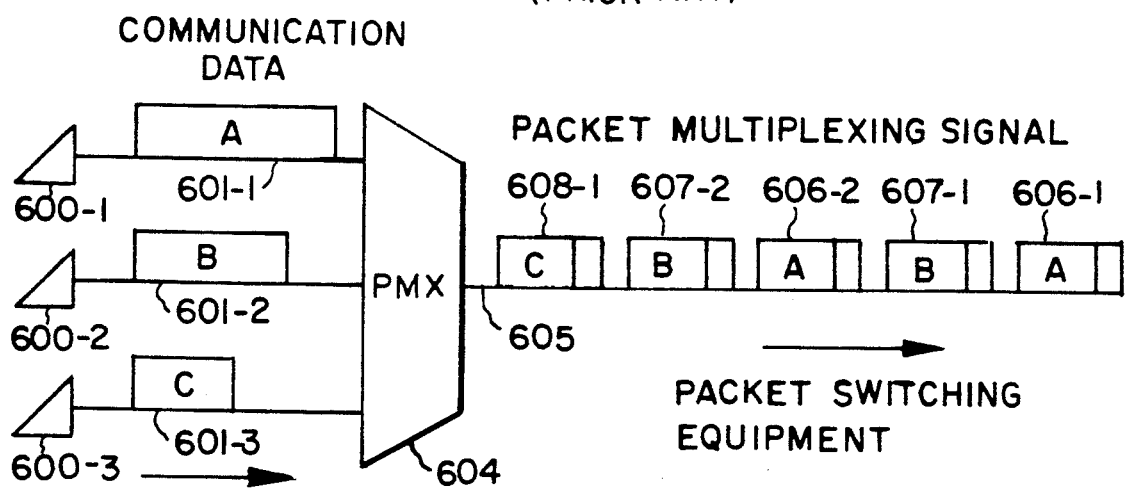
FIGS. 31 and 32 are views each representing prior art packet concentrating systems.
Figure 32:
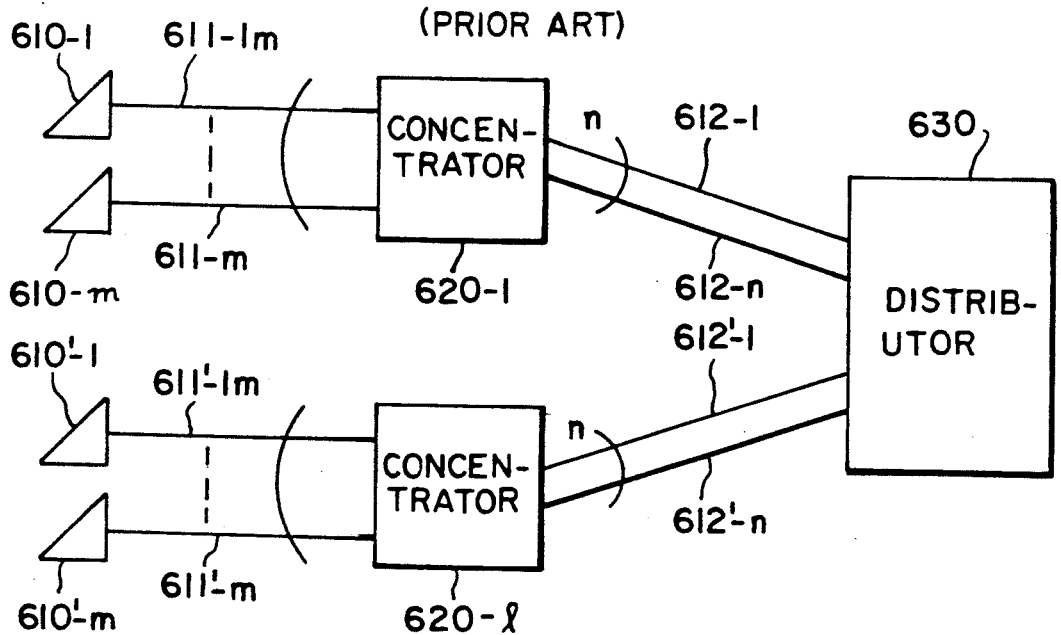

In FIG. 30, a signal sequence between the processor 511 in the CP module 303 (FIG. 26) and the line interface 300 is shown. When the CP module receives a response signal 460 from a terminal or transit line, it executes a response processing 461 and sends to the line interface 300 a charging start signal 462 with an information LCN for packet counting as the parameter. In the line interface 300, when the microcomputer 356 receives this signal through the LCN distributor 360, it actuates the traffic controller 351 with the LCN for the packet counting, and simultaneously, sends to the CP module 303 an ACK signal 463 through the control packet inserter 355 with the maximum value of the counter (value of overflow) in the traffic controller which is included in its parameter. When the processor 511 in the CP module 303 receives this signal, it initializes a counter table 464 which stores the packet numbers counted for an information LCN in the memory. Hereinafter, a count up is conducted for an LCN in the traffic controller 351 whenever an information packet passes through the line interface 300. If the counter overflows, it sends overflow signals 465 and 465' to the CP module 303. Then, the processor in the CP module 303 renews the counter table in the memory 512 by the value of overflow (466 to 468). When the processor 512 receives from a terminal or transit line a release signal 469 which is a requirement signal for call release, it executes a call releasing process 470, and sends a charging stop signal 471 to the line interface 300 simultaneously. The line interface 300 returns a charging stop ACK signal 472 with a packet number counted as parameter. The processor adds the above-mentioned value to the values of the counter table 479, and after obtaining the total packet number, the processor registers it in the tariff table for a line number obtainable from the LCN-to-line number conversion table 48C (474 to 475).

As set forth above, in each of the Embodiments 1 to 3, the packet concentrator 1 concentrates a plurality of packet lines on a packet line connected to the higher packet switching equipment 2. However, this connection can be arranged in a plurality of parallel connections so as to allow the concentrator to comprise a plurality of equivalent output lines.

The subject invention can be summarily characterized in having the following beneficial effects.

In the ATM (Asynchronous Transfer Mode) of BISDN (Broadband ISDN), it is assumed that the packet network performs at a high speed of approximately 150 Mbps per line. In a line with 150 Mbps, multimedia such as voice/data/video can be communicated, and as compared with the data network/telephone network currently available, the concentrating ratio becomes extremely high, so that in view of the cost of network, a concentrator is considered more important than a switching equipment itself.

The concentrator according to the present invention is simpler than the conventional packet concentrator employed at a concentrating stage because it is a simple concentrator without any of the functions of call processing and it does not terminate a control signal. Therefore, there is no need not only for such hardware as a signal terminator, a processor, and memories for main and auxiliary storages, but also for the associated software for controlling any connection on a call, logical channel number (LCN), tariff and necessary others. As a result, the cost of the entire network can be reduced significantly.

The invention has been described with reference to preferred embodiments. Modifications and alterations will occur to others upon the reading and understanding of this specification. It is our intention to include all such modifications and alterations in so far as they come within the scope of the appended claims and the equivalents thereof.

What is claimed is:

1. A method of concentrating calls for a packet switching system in an hierarchical communication network wherein a plurality of call terminals communicate along first number lines to a plurality of packet concentrators that communicate with first switching equipment along second number lines, the method comprising:
   initiating a call at a call terminal to be communicated along a one of the first number lines to a one of the packet concentrators;
   associating the one of the first number lines with a first logic channel number for identification of call communication from the one of the packet concentrators to the switching equipment; and,
   recording the first logic channel number in association with the one of the first number lines at the packet concentrator wherein call communication back to the call terminal can be made on the one of the first number lines by relating the one of the first number of lines with the first logic channel number of the call for concentrating multiplexed packet lines without switching logic channels at the packet concentrator for overall reduced call processing.

2. The method as described in claim 1 wherein the recording comprises maintaining a conversion table at the packet concentrator relating the first logic channel number and the one of the first number lines.

3. The method as described in claim 1 wherein the recording comprises inserting a line number representative of the one of the first number lines into a packet header communicated between the packet concentrator and the switching equipment.

4. The method as described in claim 1 further including executing of general call processing at the switching equipment including tariff control for call communication between the call terminal and the packet concentrator.

5. The method as described in claim 1 further including requesting the assigning of the first logic channel number with a call set up signal.

6. The method as described in claim 5 wherein the requesting includes assigning the one of the first line numbers to a signal logic channel before the switching equipment codes the call with the first logic channel number.

7. The method as described in claim 6 wherein the coding comprises selecting an idle logic channel number by the switching equipment to be the first logic channel number.

8. The method as described in claim 1 further including identifying the call by the first logic channel number both when communicating the call to the packet concentrator from the call terminal, and to the switching equipment from the concentrator.

9. A packet concentrator in a packet network in which an upward packet communicated on a specific one of a first group of lines packed in multiplexed packets and identified by association with a logical channel number is concentrated by the packet concentrator on a second group of lines in multiplexed packets having a smaller number of lines than said lines in the first group, comprising:
   a means for identification of:
   a downward packet from said lines in the second group, which terminates at the packet concentrator, and
   the specific one of the first group of lines, by the logical channel number whereby the upward and downward packets are communicated by the concentrator with the same logical channel number for reduced call processing at the concentrator.

10. The packet concentrator according to claim 9, wherein when a terminating packet from the specific one of said lines in the first group is sent to a second line of said lines in the second group, means are provided for reading the logical channel number of the terminating packet from said specific one, and storing said channel number being in use for said specific one, so that when a packet from the second group of lines terminates, the logical channel number in said packet is read, and then, said specific one is selected as said specific line with reference to said stored channel number.

11. The packet concentrator according to claim 10, including means for storing said logical channel number when a packet of requirement signal for assignment of a control logical channel terminates.

12. A packet concentrator according to claim 10, including means for storing said logical channel number when a packet of requirement signal for link setup terminates.

13. A communication network having:
a packet concentrator in a network for concentrating a first group of lines packed in multiplexed packets, using a first logical channel, on a second group of lines, in multiplexed packets using a second logical channel having a smaller number of lines than the lines of the first group;
a packet switching equipment connected to said concentrator through said second group of lines, wherein the concentrator includes means for storing a logical number identifying a first line of the first group of lines when a packet of requirement signal for assignment of a logical channel associated with the first line of said lines in the first group terminates at said packet concentrator; and,
means for reading the first line stored in the packet concentrator by said logical channel when a packet having a logical channel number for information hunted by the packet switching equipment at the time of establishing call setup terminates, whereby a terminating information packet from the second group of lines is sent to said first line.

14. The network according to claim 13, wherein the packet for which said logical channel number for information comprises a packet of acknowledgement signal for call setup.

15. The network according to claim 13, wherein the packet for which said logical channel number for information comprises a packet of requirement signal for call setup.

16. A packet switching system in a network having a packet concentrator for concentrating a first group of lines packed in multiplexed packets using a first logical channel on a second group of lines having a smaller number of lines than the lines of the first group, in multiplexed packets, using a second logical channel, and
a packet switching equipment being connected to said concentrator through said second group of lines, including means for using the same logical channel number as a logical channel number for the second group of lines for each call in the first group of lines,
said concentrator further having means for:
inserting a first line number into the packet when a packet from said first group of line terminates, and, sending said packet to said second group of lines,
wherein the packet switching equipment which receives the packet takes out the first line number from said packet and stores the line number for association with the logical channel number, and in that when the packet having said channel number is sent to the second line, said line number is inserted into the packet, and said packet is sent either to the packet concentrator which has received this packet or to a first line corresponding to the line number in the received packet.

17. The packet switching system according to claim 16 wherein said packet from the first line is a packet of a requirement signal for assignment of control logical channel.

18. The packet switching system according to claim 16 wherein said packet from the first line is a packet of requirement signal for link setup.

19. A packet switching system in a network having a packet concentrator for concentrating a first group of lines packed in multiplexed packets using a first logical channel on a second group of lines in multiplexed packets using a second logical channel having a smaller number of lines than the first group, and a packet switching equipment being connected to said concentrator through said second group of lines, wherein the packet switching equipment includes means for:
hunting a first logical channel number associated with said first logical channel for identifying information at the time of call setup;
reading a line number associated with the first logical channel number for a control signal;
storing the line number for the logical channel number; and,
inserting said stored line number into a terminating information packet from the second group of lines at the time of call termination.

20. The packet switching system according to claim 19, wherein the packet switching system contains a line which is connected to said packet concentrator and a line to which no packet concentrator is connected, and wherein said packet switching equipment has a means for inserting the line number into a packet when said packet terminates from the line to which no concentrator is connected.

21. The packet switching system according to claim 20, wherein the packet switching system has a means for inserting a line number into an inputted packet, a means for stopping said insertion, and a means for storing data representing whether a line is connected to a packet concentrator as a packet line or the line is not connected to any packet concentrator, and wherein a line number inserter is notified whether or not a line number is inserted in accordance with said data.

22. The packet switching system according to claim 21, wherein an operational means is provided for rewriting said data through input and output devices.

23. The packet switching system according to claim 19 wherein said packet switching equipment has a means for counting the numbers of communication packets per logical channel number for tariff information, and for registering the numbers of communication packets for a line number.

* * * * *